(12) United States Patent
Suzuki et al.

(10) Patent No.: US 11,409,591 B2
(45) Date of Patent: Aug. 9, 2022

(54) ANOMALY DETERMINATION APPARATUS, ANOMALY DETERMINATION METHOD, AND NON-TRANSITORY COMPUTER READABLE MEDIUM STORING PROGRAM

(71) Applicant: NEC Corporation, Tokyo (JP)

(72) Inventors: Ryota Suzuki, Tokyo (JP); Shigeru Koumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/769,752

(22) PCT Filed: Jun. 28, 2018

(86) PCT No.: PCT/JP2018/024558
§ 371 (c)(1),
(2) Date: Jun. 4, 2020

(87) PCT Pub. No.: WO2019/111435
PCT Pub. Date: Jun. 13, 2019

(65) Prior Publication Data
US 2020/0387418 A1     Dec. 10, 2020

(30) Foreign Application Priority Data
Dec. 5, 2017  (JP) .............................. JP2017-233083

(51) Int. Cl.
*G06F 11/07* (2006.01)
(52) U.S. Cl.
CPC ........ *G06F 11/079* (2013.01); *G06F 11/0751* (2013.01)
(58) Field of Classification Search
CPC .................... G06F 11/079; G06F 11/0751
See application file for complete search history.

(56) References Cited

U.S. PATENT DOCUMENTS 5,919,267 A * 7/1999 Urnes ................. G06N 3/0454
714/E11.026
8,656,226 B1 * 2/2014 Havemose ......... G06F 11/0715
714/47.3

(Continued)

FOREIGN PATENT DOCUMENTS

JP    2009-200208 A    9/2009
JP    2011-164950 A    8/2011

(Continued)

OTHER PUBLICATIONS

2019 Revised Patent Subject Matter Eligibility Guidance Appendix 1, pp. 30-41 (Year: 2019).*

(Continued)

*Primary Examiner* — Jonathan D Gibson
(74) *Attorney, Agent, or Firm* — Sughrue Mion, PLLC

(57) ABSTRACT

An anomaly determination apparatus, an anomaly determination method, and a program, capable of easily determining whether or not an anomaly has occurred are provided. An anomaly determination apparatus (1) includes a transformation unit (2) and an anomaly determination unit (3). The transformation unit (2) performs a transformation process using a transform function for transforming an anomaly level of a signal into a probability variable value, the probability variable value being a variable value in accordance with a predetermined probability distribution. Note that the transform function is a monotone function. The anomaly determination unit (3) determines presence/absence of an anomaly of a sample of the anomaly level by using a result of the transformation by the transformation unit (2).

13 Claims, 16 Drawing Sheets

(56) References Cited

U.S. PATENT DOCUMENTS

| | | | |
|---|---|---|---|
| 9,628,499 B1* | 4/2017 | Yu | H04L 43/022 |
| 2015/0100525 A1 | 4/2015 | Rodrigues Vistulo De Abreu et al. | |
| 2016/0139977 A1* | 5/2016 | Ashani | G06N 3/08 714/26 |
| 2016/0147585 A1* | 5/2016 | Konig | G06F 16/20 714/37 |
| 2017/0075907 A1* | 3/2017 | Goswami | G06F 16/119 |
| 2017/0192872 A1* | 7/2017 | Awad | G06K 9/6284 |
| 2018/0013776 A1* | 1/2018 | Gay | G06N 3/126 |
| 2018/0276063 A1* | 9/2018 | Mendes | H04L 41/0686 |
| 2018/0365091 A1* | 12/2018 | Donaldson | G06F 11/0772 |
| 2019/0102240 A1* | 4/2019 | Zarrini | G06F 11/0775 |

FOREIGN PATENT DOCUMENTS

| | | |
|---|---|---|
| JP | 2015-170121 A | 9/2015 |
| JP | 2017-194341 A | 10/2017 |

OTHER PUBLICATIONS

C.M.Bishop, "Novelty detection and neural network validation", IEE Proceedings-Vision, Image and Signal Processing, vol. 141, No. 4, Aug. 1994, p. 217-p. 222.
International Search Report for PCT Application No. PCT/JP2018/024558, dated Sep. 18, 2018.

* cited by examiner

|  |  | TRANSFORM FUNCTION | |
|---|---|---|---|
|  |  | MONOTONIC INCREASE | MONOTONIC DECREASE |
| ANOMALY LEVEL | INCREASE IN ANOMALOUS STATE | (1) | (2) |
| | DECREASE IN ANOMALOUS STATE | (3) | (4) |

Fig. 4

|  |  | DETERMINATION RESULT A ||
|  |  | NORMAL | ANOMALOUS |
| DETERMINATION RESULT B | NORMAL | (a) | (b) |
|  | ANOMALOUS | (c) | (d) |

Fig. 9

ANOMALY DETERMINATION APPARATUS, ANOMALY DETERMINATION METHOD, AND NON-TRANSITORY COMPUTER READABLE MEDIUM STORING PROGRAM

This application is a National Stage Entry of PCT/JP2018/024558 filed on Jun. 28, 2018, which claims priority from Japanese Patent Application 2017-233083 filed on Dec. 5, 2017, the contents of all of which are incorporated herein by reference, in their entirety.

TECHNICAL FIELD

The present invention relates to an anomaly determination apparatus, an anomaly determination method, and a non-transitory computer readable medium storing a program. In particular, the present invention relates to an anomaly determination apparatus, an anomaly determination method, and a non-transitory computer readable medium storing a program for determining presence/absence of an anomaly.

BACKGROUND ART

It is important to determine whether or not an apparatus or a system that performs predetermined processes is properly operating, i.e., whether or not an anomaly has occurred in signals obtained from the apparatus or the system. Techniques related to such determinations include, for example, the following technique.

Patent Literature 1 discloses a diagnosis apparatus using a Mahalanobis distance. This diagnosis apparatus determines whether or not a product satisfies desired quality based on whether or not the Mahalanobis distance is within a predetermined threshold.

Further, Non-patent Literature 1 discloses a method for monitoring an oil flow in multiphase pipelines using neural networks. In this monitoring method, validity of a network is checked (network validation) by using a threshold criterion for estimates of a joint probability distribution function (a joint probability density function).

CITATION LIST

Patent Literature

Patent Literature 1: Japanese Unexamined Patent Application Publication No. 2009-200208

Non Patent Literature

Non-patent Literature 1: C. M. Bishop "Novelty detection and neural network validation" IEE Proceedings-Vision, Image and Signal Processing, Vol. 141, No. 4, August 1994

SUMMARY OF INVENTION

Technical Problem

However, when it is determined whether or not the product satisfies the desired quality by the diagnosis apparatus disclosed in Patent Literature 1, it is difficult to set a predetermined threshold to an appropriate value. The first reason for the difficulty is that since the Mahalanobis distance can take any positive real value, it is difficult to set a threshold to an appropriate value while assuming a range of values for the Mahalanobis distance in advance. Further, the second reason is that the appropriately-set threshold also changes as the target reference space (the Mahalanobis space) changes. Therefore, when quality of different manufacturing facilities or different products is determined, it is necessary to individually set a different threshold for each manufacturing facility or each product.

Further, even if the validity of the network is checked by using the monitoring method disclosed in Non-patent Literature 1, it is difficult to set the threshold criterion to an appropriate value. This is because when the estimate of the joint probability distribution function changes, the appropriately-set threshold also changes. Therefore, it is necessary to reset the threshold criterion every time the network is trained for improving the performance of the network or for other similar reasons.

Therefore, one of the objects that are achieved by example embodiments disclosed herein is to provide an anomaly determination apparatus, an anomaly determination method, and a non-transitory computer readable medium storing a program, capable of easily determining whether or not an anomaly has occurred.

Solution to Problem

An anomaly determination apparatus according to a first aspect includes: transformation means for performing a transformation process using a transform function for transforming an anomaly level of a signal into a probability variable value, the probability variable value being a variable value in accordance with a predetermined probability distribution; and anomaly determination means for determining presence/absence of an anomaly of a sample of the anomaly level by using a result of the transformation by the transformation means, in which the transform function is a monotone function.

In a method for determining an anomaly according to a second aspect, a transformation process using a transform function for transforming an anomaly level of a signal into a probability variable value is performed, the probability variable value being a variable value in accordance with a predetermined probability distribution; and presence/absence of an anomaly of a sample of the anomaly level is determined by using a result of the transformation by the transformation process, in which the transform function is a monotone function.

A program according to a third aspect causes a computer to perform: a transformation step of performing a transformation process using a transform function for transforming an anomaly level of a signal into a probability variable value, the probability variable value being a variable value in accordance with a predetermined probability distribution; and an anomaly determination step of determining presence/absence of an anomaly of a sample of the anomaly level by using a result of the transformation by the transformation step, in which the transform function is a monotone function.

Advantageous Effects of Invention

According to the above-described aspect, it is possible to provide an anomaly determination apparatus, an anomaly determination method, and a non-transitory computer readable medium storing a program, capable of easily determining whether or not an anomaly has occurred.

BRIEF DESCRIPTION OF DRAWINGS

FIG. 4 is a table in which determination criteria used in an anomaly determination unit according to the first example embodiment are summarized;

FIG. 9 is a table in which an example of an operation for determining an anomaly by combining a determination result A and a determination result B in an anomaly determination unit according to the second example embodiment are summarized;

DESCRIPTION OF EMBODIMENTS

For clarifying the explanation, the following descriptions and the drawings are partially omitted and simplified as appropriate. The same symbols are assigned to the same elements throughout the drawings, and duplicated explanations are omitted as necessary.

Outline of Example Embodiment

Figure 1:
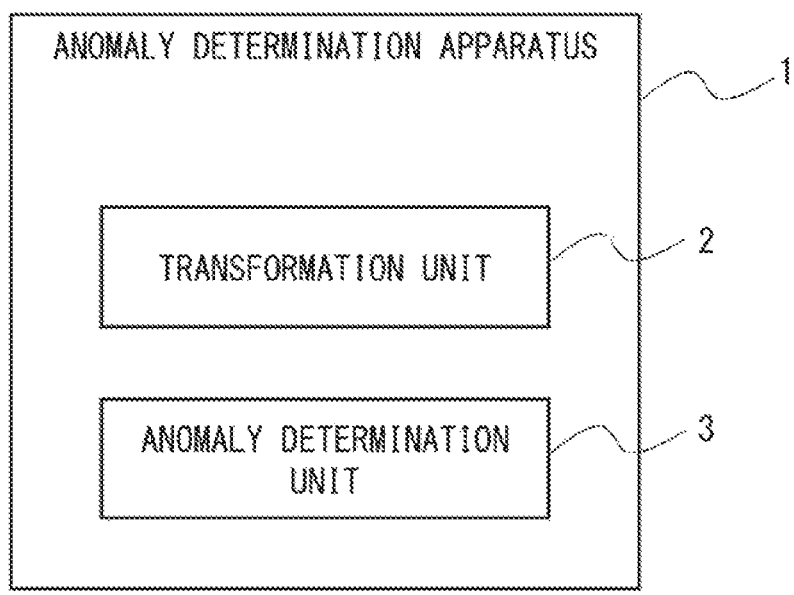
FIG. 1 is a block diagram showing an example of a configuration of an anomaly determination apparatus according to an outline of an example embodiment.

Prior to describing example embodiments, an outline of an example embodiment according to the present invention will be described. FIG. 1 is a block diagram showing an example of a configuration of an anomaly determination apparatus 1 according to an outline of an example embodiment. As shown in FIG. 1, the anomaly determination apparatus 1 includes a transformation unit 2 and an anomaly determination unit 3. The anomaly determination apparatus 1 is, for example, an apparatus for determining whether or not a predetermined process performed by an apparatus or a system that performs an arbitrary predetermined process (hereinafter referred to as a determination-target apparatus) is in a normal state or an anomalous (failure) state.

The transformation unit 2 performs a transformation process using a transform function for transforming an anomaly level of a signal into a probability variable value which is a variable value in accordance with a predetermined probability distribution. Note that this transform function is a monotone function. That is, the transform function is a monotone increasing function or a monotone decreasing function. For example, the signal is a signal that is output from a determination-target apparatus when it performs a predetermined process, and the anomaly level is an index value indicating a degree of anomaly of the output signal. That is, the transformation unit 2 transforms, for example, an index value indicating a degree of anomaly of a signal that is output from the determination-target apparatus when it performs a predetermined process into a probability variable value which is a variable value in accordance with a predetermined probability distribution. Hereinafter, this predetermined probability distribution may also be referred to as a specific probability distribution.

The anomaly determination unit 3 determines the presence/absence of an anomaly of a sample of the anomaly level by using a result of the transformation by the transformation unit 2. That is, the anomaly determination unit 3 determines whether or not the sample of the anomaly level of the signal is a sample indicating an anomaly. The fact that an anomaly has occurred in the sample for the anomaly level means that an anomaly has occurred in the signal. Therefore, it can be considered that the anomaly determination unit 3 determines whether or not an anomaly has occurred in the signal. In other words, it can be considered that the anomaly determination unit 3 determines whether or not an anomaly has occurred in a process performed by the determination-target apparatus that has output the signal.

According to the anomaly determination apparatus 1, a value indicating an anomaly level of a signal is transformed into a probability variable value, which is a variable value in accordance with a predetermined probability distribution (a specific probability distribution), by the transformation unit 2. That is, the value indicating the anomaly level of the signal is transformed into a probability variable value whose range and distribution are specified in advance. Therefore, it is possible to determine the presence/absence of an anomaly without depending on the distribution of the signal. That is, according to the anomaly determination apparatus 1, it is possible to easily determine whether or not an anomaly has occurred in a signal.

First Example Embodiment

Figure 2:
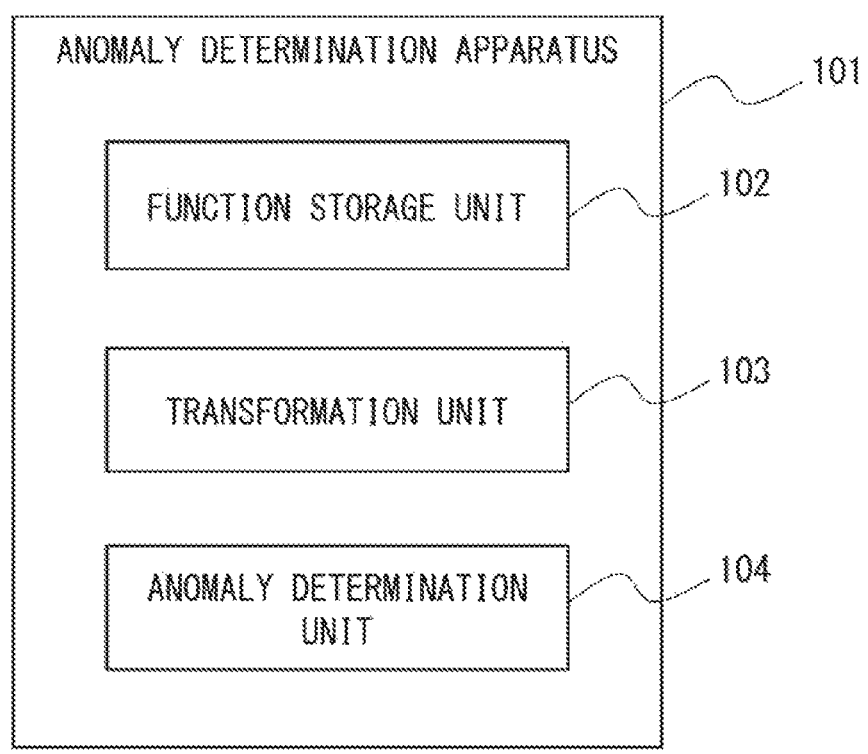
FIG. 2 is a block diagram showing an example of a configuration of an anomaly determination apparatus according to a first example embodiment.

Example embodiments according to the present invention will be described hereinafter. FIG. 2 is a block diagram showing an example of a configuration of an anomaly determination apparatus 101 according to the first example embodiment. As shown in FIG. 2, the anomaly determination apparatus 101 includes a function storage unit 102, a transformation unit 103, and an anomaly determination unit 104. Note that the transformation unit 103 corresponds to the transformation unit 2 shown in FIG. 1, and the anomaly determination unit 104 corresponds to the anomaly determination unit 3 shown in FIG. 1.

The function storage unit 102 stores, in advance, parameters representing a monotonic transform function for transforming a numerical value of an anomaly level of a signal into a probability variable which is a variable in accordance with a predetermined probability distribution (a specific probability distribution). The signal is, for example, a signal that is output by a determination-target apparatus when it is performing a predetermined process. Specifically, the signal may be, for example, a sound waveform, an oscillatory waveform, a current waveform, a voltage waveform, communication traffic, log data, etc. Further, the numerical value of the anomaly level may be, for example, a feature value extracted from the signal, or a distance (a Euclid distance, a Mahalanobis distance, etc.) indicating how far the feature value is from a normal value in a feature value space. Further, the numerical value of the anomaly level may be a similarity level (a correlation coefficient etc.) indicating how close the feature value is to the normal value in the feature value space. Further, the anomaly level may be a quantity indicating a degree of certainty of an occurrence of the signal (a likelihood function (a probability density function) etc.). That is, the anomaly level may be a likelihood of the signal.

Note that the specific probability distribution may be any type of a distribution, for example, a uniform distribution. In the case where the specific probability distribution is a uniform distribution, for example, when the anomaly level conforms to a normal distribution having a mean u and a standard deviation v, a function expressed by the below-shown Expression (1) can be used as the transform function.

[Expression 1]

$$f_0(x) = \Phi((x-u)/v) \quad (1)$$

In the expression, the function $\Phi(x)$ is a cumulative distribution function of a standard normal distribution. In this case, the function storage unit 102 stores the parameters u and v in advance.

The transformation unit 103 performs a transformation process by using a function defined by the parameters stored in advance in the function storage unit 102 (i.e., by using, for example, the Expression (1)).

Further, the anomaly determination unit 104 determines the presence/absence of an anomaly by using a result of the transformation by the transformation unit 103 and a threshold.

Figure 3:
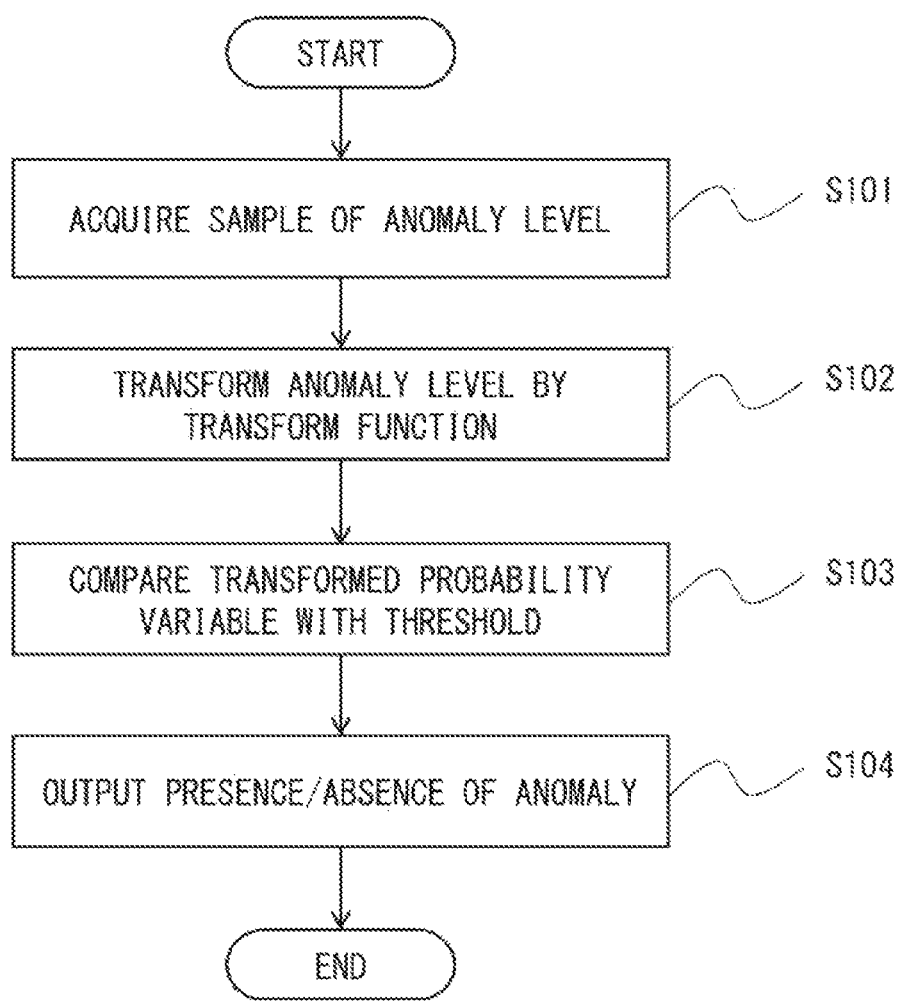
FIG. 3 is a flowchart showing a flow of an example of processes performed in the anomaly determination apparatus according to the first example embodiment.

Next, an example of processes performed in the anomaly determination apparatus 101 will be described in detail with reference to FIG. 3. FIG. 3 is a flowchart showing a flow of an example of processes performed in the anomaly determination apparatus 101 according to the first example embodiment. Firstly, the transformation unit 103 acquires a sample of an anomaly level (step 101 (S101)). For example, the transformation unit 103 may acquire a sample of an anomaly level that the anomaly determination apparatus 101 has received from other apparatuses or the like, or acquire a sample of an anomaly level stored in a storage device of the anomaly determination apparatus 101. Note that the anomaly level has already been calculated based on the signal value before being acquired by the transformation unit 103. The anomaly level may be calculated by the anomaly determination apparatus 101 or by other apparatuses. In the case where the anomaly level is calculated by the anomaly determination apparatus 101, the anomaly determination apparatus 101 may include, for example, an anomaly-level calculation unit that calculates a predetermined anomaly level from a signal output from the determination-target apparatus.

Next, the transformation unit 103 transforms the anomaly level x1 of the signal acquired in the step 101 into a value of a probability variable which is a value in accordance with the specific probability distribution by using a transform function defined by the parameters stored in advance in the function storage unit 102 (step 102 (S102)). For example, when the specific probability distribution is a uniform distribution and the anomaly level x1 conforms to a normal distribution having a mean u and a standard deviation v, the transformation unit 103 transforms the anomaly level x1 into a probability variable y1 according to the Expression (1).

Next, the anomaly determination unit 104 determines the presence/absence of an anomaly by comparing the probability variable obtained in the step 102 with a threshold a (step 103 (S103)). That is, the anomaly determination unit 104 determines the presence/absence of an anomaly by comparing a result of the transformation obtained by applying the transform function to the sample with the threshold. In the step 103, according to the behavior of the anomaly level x1 in the anomaly state and the characteristic of the transform function f, the anomaly determination unit 104 determines the presence/absence of an anomaly based on one of the below-shown four criteria as shown in FIG. 4.

When the anomaly level x1 is a value that increases in the anomaly state and the transform function f is a monotone increasing function (i.e., in the case of the criterion (1) in the table shown in FIG. 4), the anomaly determination unit 104 determines that an anomaly has occurred when the probability variable y1 is larger than the threshold a.

When the anomaly level x1 is a value that increases in the anomaly state and the transform function f is a monotone decreasing function (i.e., in the case of the criterion (2) in the table shown in FIG. 4), the anomaly determination unit 104 determines that an anomaly has occurred when the probability variable y1 is smaller than the threshold a.

When the anomaly level x1 is a value that decreases in the anomaly state and the transform function f is a monotone increasing function (i.e., in the case of the criterion (3) in the table shown in FIG. 4), the anomaly determination unit 104 determines that an anomaly has occurred when the probability variable y1 is smaller than the threshold a.

When the anomaly level x1 is a value that decreases in the anomaly state and the transform function f is a monotone decreasing function (i.e., in the case of the criterion (4) in the table shown in FIG. 4), the anomaly determination unit 104 determines that an anomaly has occurred when the probability variable y1 is larger than the threshold a.

For example, in the case where the transform function is the function $f_0(x)$ in the Expression (1), because the function $f_0(x)$ is a monotone increasing function, when the anomaly level is a value that decreases in the anomaly state, the anomaly determination unit 104 determines that an anomaly has occurred when the value $f_0(x)$ of the probability variable is smaller than the threshold a.

Lastly, the anomaly determination unit 104 outputs the presence/absence of an anomaly determined in the step 103 (step 104 (S104)). The anomaly determination unit 104 may display and output a result of the determination on a display or the like, or may transmit the result of the determination to other apparatuses.

Figure 5:
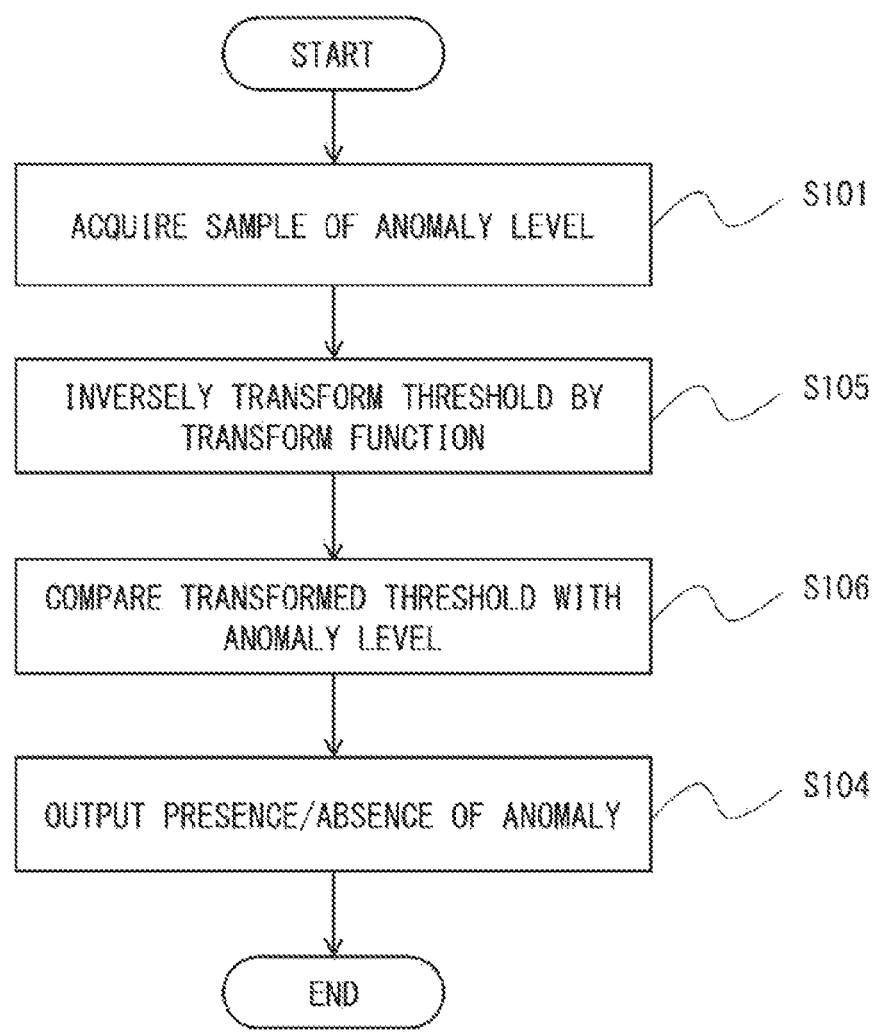
FIG. 5 is a flowchart showing another example of a flow of processes performed in the anomaly determination apparatus according to the first example embodiment.

Next, another example of processes performed in the anomaly determination apparatus 101 according to the first example embodiment will be described in detail with reference to FIG. 5. FIG. 5 is a flowchart showing another example of a flow of processes performed in the anomaly determination apparatus 101 according to the first example embodiment. Note that in FIG. 5, the same symbols are assigned to steps in which operations similar to those in FIG. 3 are performed, and redundant descriptions thereof are omitted.

After the step 101, the transformation unit 103 transforms (inversely transforms) the threshold a by using the inverse function of the transform function defined by the parameters stored in advance in the function storage unit 102 (step 105 (S105)). For example, when the specific probability distribution is a uniform distribution and the anomaly level x1 conforms to a normal distribution having a mean u and a standard deviation v, the transformation unit 103 transforms the threshold a according to the below-shown Expression (2).

[Expression 2]

$$f_0^{-1}(a) = v \times \Phi^{-1}(a) + u \qquad (2)$$

In the expression, the function $\Phi^{-1}(x)$ is an inverse function of a cumulative distribution function of a standard normal distribution.

After the step 105, the anomaly determination unit 104 determines the presence/absence of an anomaly by comparing a threshold $f^{-1}(a)$ transformed in the step 105 with the anomaly level x1 (step 106 (S106)). That is, the anomaly determination unit 104 determines the presence/absence of an anomaly by comparing a result of the transformation obtained by applying the inverse function of the transform function to the threshold with the sample. In the step 106, similarly to step 103, the determination is made according to the characteristic of the transform function. That is, as shown in FIG. 4, the anomaly determination unit 104 determines the presence/absence of an anomaly based on one of the below-shown four criteria.

When the anomaly level x1 is a value that increases in the anomaly state and the transform function f is a monotone increasing function (i.e., in the case of the criterion (1) in the table shown in FIG. 4), the anomaly determination unit 104 determines that an anomaly has occurred when the anomaly level x1 is larger than the transformed threshold $f^{-1}(a)$.

When the anomaly level x1 is a value that increases in the anomaly state and the transform function f is a monotone decreasing function (i.e., in the case of the criterion (2) in the table shown in FIG. 4), the anomaly determination unit 104 determines that an anomaly has occurred when the anomaly level x1 is smaller than the transformed threshold $f^{-1}(a)$.

When the anomaly level x1 is a value that decreases in the anomaly state and the transform function f is a monotone increasing function (i.e., in the case of the criterion (3) in the table shown in FIG. 4), the anomaly determination unit 104 determines that an anomaly has occurred when the anomaly level x1 is smaller than the transformed threshold $f^{-1}(a)$.

When the anomaly level x1 is a value that decreases in the anomaly state and the transform function f is a monotone decreasing function (i.e., in the case of the criterion (4) in the table shown in FIG. 4), the anomaly determination unit 104 determines that an anomaly has occurred when the anomaly level x1 is larger than the transformed threshold $f^{-1}(a)$.

In the operations in the above-described two flowcharts (the flowcharts shown in FIGS. 3 and 5), the threshold a that needs to be used to determine an anomaly depends only on the specific probability distribution, and depends on neither the distribution of the signal nor the distribution of the anomaly level x1. That is, when the probability that the signal contains an anomaly is the same, the anomaly can be determined based on the same criteria using the same specific probability distribution and the same threshold a even when the distribution of the signal or the anomaly level x1 is different. This means that the same threshold can be used for the determination of an anomaly of each signal when it is likely that the probability that each signal is anomalous is equal to each other, e.g., when a plurality of signals are emitted from one determination-target apparatus. That is, it is particularly effective because there is no need to set individual thresholds.

Further, in the case where the probability density function (the likelihood function) or the Mahalanobis distance is used as the anomaly level, even if the value of the anomaly level changes due to changes in the distribution of the signal (the probability density function) or the Mahalanobis space, it is possible, by using the same specific probability distribution before and after the change in the distribution of the signal or the Mahalanobis space, to determine an anomaly by using the same threshold. Therefore, there is no need to reset the threshold every time the distribution of the signal or the Mahalanobis space changes.

Note that the threshold can be determined from, for example, a known probability that the signal contains an anomaly (a known probability that an anomaly is likely to have occurred in a process performed by the determination-target apparatus) or a known probability that the signal is normal (contains no anomaly) (a known probability that a process performed in the determination-target apparatus is likely to be normal), and the specific probability distribution. The probability that the signal is likely to contain an anomaly may be, for example, a past anomaly occurrence rate in processes performed by the determination-target apparatus. The past anomaly occurrence rate of the determination-target apparatus is an occurrence probability calculated from the number of anomalies that have actually occurred in the determination-target apparatus, and is a known anomaly occurrence probability in processes (i.e., signals) in the determination-target apparatus. Specifically, the past anomaly occurrence rate of the determination-target apparatus is, for example, a value obtained by dividing the number of processes in each of which an anomaly has occurred by the number of all the observed processes. The probability that the signal is likely to be normal (contains no anomaly) may be, for example, a past normal rate in processes performed by the determination-target apparatus. The past normal rate in processes performed by the determination-target apparatus is a probability expressed as $1-p_{fail}$, where $p_{fail}$ is the past anomalous occurrence rate. For example, when the specific probability distribution is a uniform distribution, a probability that the value of the probability variable f(x1) is smaller than the threshold a is a probability a. In this case, when the characteristic of the transform function f is the criterion (2) or (3) in the table shown in FIG. 4, a probability that the signal is likely to contain an anomaly can be set as the threshold a in advance. Therefore, for example, since the value of the past anomaly occurrence rate may be set as the threshold a, there is no need to perform any special process to set the threshold. Further, when the characteristic of the transform function f is the criterion (1) or (4) in the table shown in FIG. 4, the threshold a can be set, in advance, as the probability that the signal is likely to be normal (contain no anomaly). Therefore, for example, since the value of the past normal rate (the probability that no anomaly occurs) may be set as the threshold a, there is no need to perform any special process to set the threshold.

Next, the effect of the anomaly determination apparatus 101 according to the first example embodiment will be described. According to the anomaly determination apparatus 101, it is possible to easily infer whether or not an anomaly has occurred in a sample.

The first reason for this easy inference is that since the probability variable obtained by applying the transform function to the sample conforms to the predetermined probability distribution (i.e., the specific probability distribution), the range of the probability variable is known in advance and hence the threshold can be easily set.

Further, secondly, even in the case where samples of a plurality of different types of signals are obtained, when the probability that the signal contains an anomaly is the same as each other, it is possible to determine, for each sample, whether or not an anomaly has occurred in that sample by using one common threshold. This is because the probability variable for which the transform function is applied to each sample conforms to the same predetermined probability distribution (i.e., the specific probability distribution).

Further, thirdly, even when the value of the anomaly level changes due to changes in the distribution of the signal, it is possible to use the same threshold before and after the change in the distribution of the signal by using the same specific probability distribution before and after the change in the distribution of the signal. That is, this is because there is no need to reset the threshold every time the distribution of the signal changes.

Second Example Embodiment

Next, a second example embodiment will be described. In the first example embodiment, it is determined whether or not a process performed by the determination-target apparatus is anomalous by comparing the anomaly level with the threshold. That is, in the first example embodiment, an anomaly that manifests itself as a change in the anomaly level can be detected. In contrast, in the second example embodiment, a determination is made by determining whether or not an acquired distribution of anomaly levels is different from a distribution of anomaly levels that is obtained when a process performed by the determination-target apparatus is normal. In this way, an anomaly that manifests itself as a change in the distribution of the anomaly level can be detected. In the following description, the characteristic features according to this example embodiment will be mainly described. Further, the same symbols are assigned to structures and processes similar to those in the above-described first example embodiment and redundant descriptions thereof are omitted.

Figure 6:
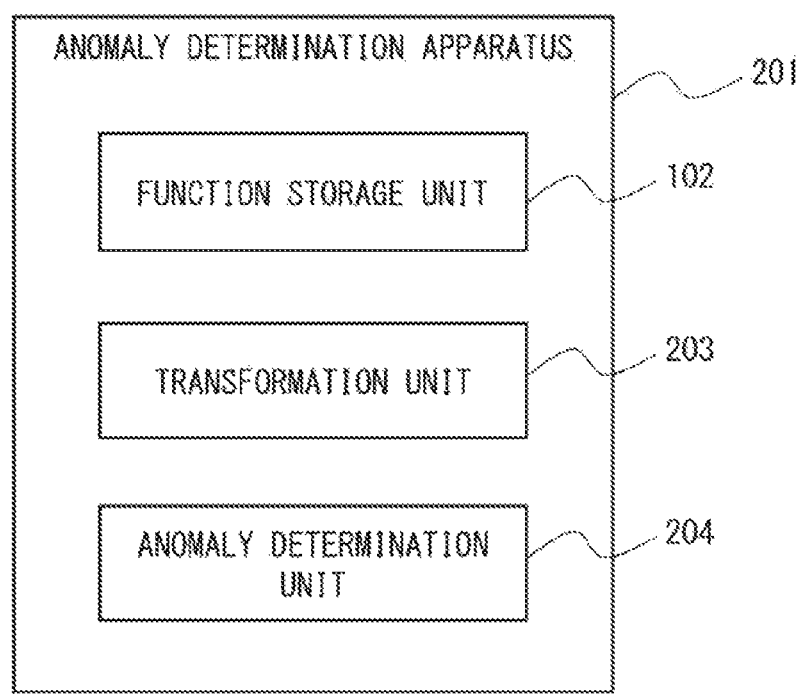
FIG. 6 is a block diagram showing an example of a configuration of an anomaly determination apparatus according to a second example embodiment.

FIG. 6 is a block diagram showing an example of a configuration of an anomaly determination apparatus 201 according to the second example embodiment. As shown in FIG. 6, the anomaly determination apparatus 201 includes a function storage unit 102, a transformation unit 203, and an anomaly determination unit 204. That is, the anomaly determination apparatus 201 is different from the anomaly determination apparatus 101 according to the first example embodiment in that the transformation unit 103 is replaced by the transformation unit 203 and the anomaly determination unit 104 is replaced by the anomaly determination unit 204. Note that the transformation unit 203 corresponds to the transformation unit 2 shown in FIG. 1, and the anomaly determination unit 204 corresponds to the anomaly determination unit 3 shown in FIG. 1.

The transformation unit 203 performs a transformation process by using a function defined by parameters stored in advance in the function storage unit 102. A transformation unit 203 transforms each of a plurality of samples of anomaly levels into a value of a probability variable.

Further, the anomaly determination unit 204 determines whether or not an anomaly has occurred in the plurality of samples by determining whether or not the plurality of probability variable values obtained by the transformation performed by the transformation unit 203 conform to a predetermined probability distribution (a specific probability distribution). Note that the anomaly determination unit 204 determines whether or not the plurality of probability variable values obtained by the transformation performed by the transformation unit 203 conform to the specific probability distribution by using a statistical test (more specifically, a statistical hypothesis test). That is, while the anomaly determination unit 104 determines the presence/absence of an anomaly by the predetermined threshold, the anomaly determination unit 204 determines the presence/absence of an anomaly by determining, by a statistical test, whether a distribution obtained by applying the transform function to a plurality of samples of anomaly levels coincides with the specific probability distribution.

Figure 7:
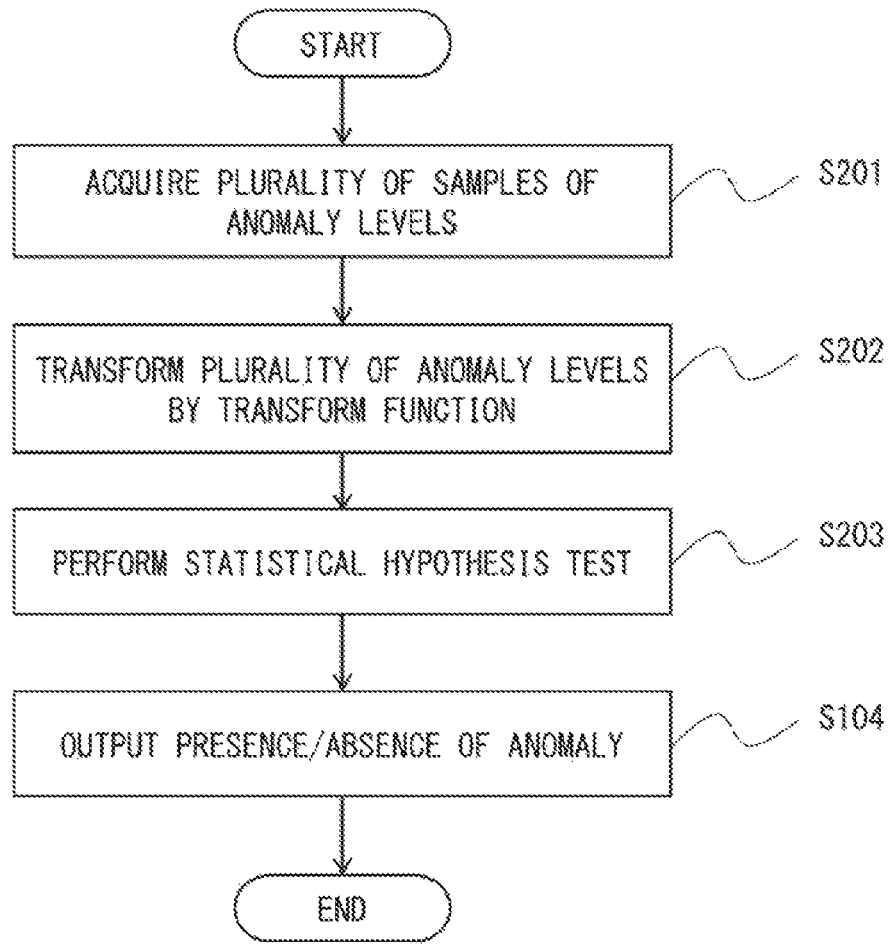
FIG. 7 is a flowchart showing a flow of processes performed in the anomaly determination apparatus according to the second example embodiment.

Next, processes performed in the anomaly determination apparatus 201 will be described in detail with reference to FIG. 7. FIG. 7 is a flowchart showing a flow of processes performed in the anomaly determination apparatus 201 according to the second example embodiment.

Firstly, the transformation unit 203 acquires a plurality of samples $x_1, \ldots, x_N$ of anomaly levels (step 201 (S201)). Note that similarly to the first example embodiment, for example, the transformation unit 203 may acquire a sample of an anomaly level that the anomaly determination apparatus 201 has received from other apparatuses or the like, or acquire a sample of an anomaly level stored in a storage device of the anomaly determination apparatus 201. Note that the anomaly level has already been calculated based on the signal value before being acquired by the transformation unit 203. The anomaly level may be calculated by the anomaly determination apparatus 201 or by other apparatuses. In the case where the anomaly level is calculated by the anomaly determination apparatus 201, the anomaly determination apparatus 201 may include, for example, an anomaly-level calculation unit that calculates a predetermined anomaly level from a signal output from the determination-target apparatus.

Next, the transformation unit 203 transforms the plurality of anomaly levels $x_1, \ldots, x_N$ acquired in the step 201 into values $y_1, \ldots, y_N$, respectively, of probability variables by using the transform function defined by the parameters stored in advance in the function storage unit 102 (step 202 (S202)).

Next, the anomaly determination unit 204 determines whether or not the plurality of probability variables calculated in the step 202 conform to the specific probability distribution based on an arbitrary predetermined statistical hypothesis test. In this way, the anomaly determination unit 204 determines whether or not an anomaly has occurred in the plurality of samples acquired in the step 201 (step 203 (S203)).

The above-described statistical hypothesis test may be, for example, a Kolmogorov-Smirnov test (a KS test). The KS test is a statistical hypothesis test under a null hypothesis that a distribution of probability variables is the same as a predetermined probability distribution. It is possible to determine whether or not the probability variable conforms to the predetermined probability distribution by determining whether or not the null hypothesis should be rejected.

As described above, the transform function defined by the parameters stored in the function storage unit 102 is a function for transforming the distribution of anomaly levels of signals into a specific probability distribution. Here, it is assumed that this transform function is a function for transforming the distribution of anomaly levels of signals in the normal state (i.e., the distribution of anomaly levels of signals that are output when processes performed by the determination-target apparatus are normal) into a specific probability distribution. In this case, when the signal is normal, the distribution of the plurality of probability variables $y_1, \ldots, y_N$, which have been obtained by transforming the respective anomaly levels, is ought to coincide with the specific probability distribution. Therefore, when the null hypothesis of the KS test for the probability variables $y_1, \ldots, y_N$ and the specific probability distribution is rejected, it means that the distribution of the probability variables $y_1, \ldots, y_N$ do not coincide with the specific probability distribution. Therefore, it is possible to determine that an anomaly has occurred in the signal.

An operation performed by the anomaly determination unit 204 will be described hereinafter by using an example case in which the specific probability distribution is a uniform distribution in an interval [0, 1]. However, the present invention is not limited to such an example case.

A plurality of samples are represented by $x_n$ (n=1, ..., N) and probability variables obtained by applying the transform function to the samples $x_n$ are expressed as $y_n=f(x_n)$. Note that a cumulative probability $P_N(y)$ of the probability variables $y_n$ is expressed by the below-shown Expression (3). In the expression, the symbol |A| represents the number of elements of the set A.

[Expression 3]

$$P_N(y)=|\{n=1, \ldots, N | y_n \leq y\}|/N \qquad (3)$$

Meanwhile, the cumulative probability P(y) of the uniform distribution is expressed by the below-shown Expression (4).

[Expression 4]

$$P(y)=y(0 \leq y \leq 1) \qquad (4)$$

Note that the test statistic in the KS test is expressed by the below-shown two Expressions (5).

[Expression 5]

$$D^+=\sup_y(P_N(y)-P(y))$$

$$D^-=\sup_y(P(y)-P_N(y)) \qquad (5)$$

Figure 8:
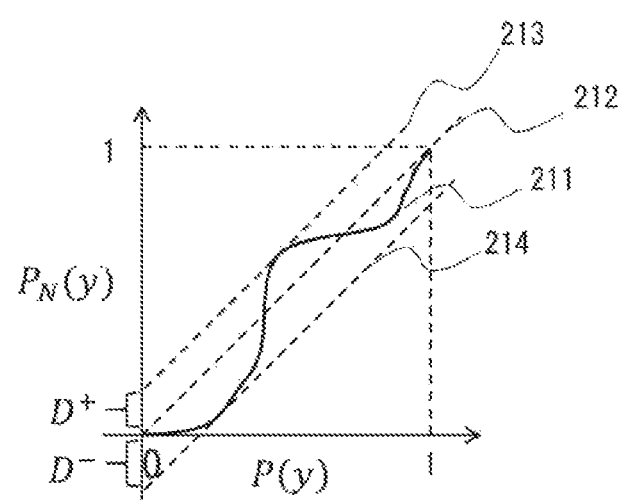
FIG. 8 is a graph schematically showing statistics $D^+$ and $D^-$ in a KS test.

FIG. 8 is a graph schematically showing statistics $D^+$ and $D^-$ in the KS test. A curve 211 is a figure obtained by a locus of a point $(P(y), P_N(y))$ when y is changed. Since $P(y)$ and $P_N(y)$ are both monotone increasing functions and have a range of [0, 1], it is a curve that starts at a point (0, 0) and ends at a point (1, 1). A straight line 212 (a broken line) is a line that passes through the points (0, 0) and (0, 1). A line 213 (a broken line) is a line having the largest intercept among the lines that are parallel to the line 212 and have intersections with the curve 211. The statistic $D^+$ in the KS test is the positive intercept of the line 213. A line 214 (a broken line) is a line having the smallest intercept among the lines that are parallel to the line 212 and have intersections with the curve 211. The statistic $D^-$ in the KS test is the negative intercept of the line 214.

When the distribution of the probability variable is identical to the uniform distribution, it is expected that P(y) is equal to $P_N(y)$ ($P(y)=P_N(y)$). Therefore, when the distribution of the probability variable is identical to the uniform distribution, it is expected that the lines 213 and 214 get close to the line 212. That is, the values of $D^+$ and $D^-$ approach zero. Therefore, when the values of $D^+$ and $D^-$ are larger than a threshold K, the null hypothesis is rejected, and the anomaly determination unit 204 determines that the distribution of the probability variable is not identical to the uniform distribution (determines that an anomaly has occurred). Note that a constant value can be used as the value of the threshold K irrespective of the distribution of the signal or the anomaly level. Note that since the value of the threshold K is a value that is determined based on the significance level, it can be easily set.

Hereinafter, the result of the determination by the anomaly determination unit 104 of the anomaly determination apparatus 101 according to the first example embodiment is referred to as a determination result A, and the result of the determination by the above-described anomaly determination unit 204 is referred to as a determination result B. A configuration in which a final determination result is obtained by combining the determination results A and B may be adopted. That is, the anomaly determination unit 204 of the anomaly determination apparatus 201 according to the second example embodiment may determine an anomaly by combining a determination result A obtained by a determination process similar to the operation performed by the anomaly determination unit 104 according to the first example embodiment and a determination result B obtained by the determination process performed by the above-described anomaly determination unit 204.

FIG. 9 is a table in which examples of operations for determining an anomaly by combining the determination results A and B in the anomaly determination unit 204 are summarized. For example, when at least one of the determination results A and B indicates an anomaly (the criteria (b), (c) and (d) in FIG. 9), the anomaly determination unit 204 determines that an anomaly has occurred. Further, for example, in the case of a result in which the determination results A and B both indicate a normal state (the criterion (a) in FIG. 9), the anomaly determination unit 204 determines that it is in a normal state.

Note that while the determination result A in the first example embodiment is a result for determining the presence/absence of an anomaly from a sample of one anomaly level, the determination result B in the second example embodiment can be regarded as a result for determining the presence/absence of an anomaly from a distribution of a plurality of anomaly levels. For example, when the plurality of anomaly levels $x_1, \ldots, x_n$ are time-series data, the determination result ... A accurately determines the presence/absence of an anomaly that occurs in a brief moment. In contrast, in the case of an anomaly that occurs gradually and continuously over time, it is difficult to determine whether or not an anomaly has occurred by cutting out one time point. Therefore, the accuracy of the determination result A is poor. Further, although the determination result B accurately determines the presence/absence of an anomaly that occurs gradually and continuously over time, its accuracy deteriorates when it determines an instant anomaly that rarely occurs. Therefore, by making a determination by combining the determination results A and B, it is possible to accurately determine anomalies that occur in various time scales.

Next, the effect of the anomaly determination apparatus 201 according to the second example embodiment will be described. According to the anomaly determination apparatus 201, it is possible to easily infer whether or not an anomaly has occurred in a sample. The reason for this easy inference is that a constant value can be used as the threshold in the statistical probability test (e.g., the threshold K in the KS test) irrespective of the distributions of the signal or the anomaly level, the threshold can be easily set.

Further, according to the anomaly determination apparatus 201, it is possible to determine an anomaly more accurately. This is because it is possible to accurately determine anomalies that occur in various time scales as described above with reference to FIG. 9.

Third Example Embodiment

Next, a third example embodiment will be described. In the following description, the characteristic features according to this example embodiment will be mainly described. Further, the same symbols are assigned to structures similar to those in the above-described first example embodiment and redundant descriptions thereof are omitted.

Figure 10:
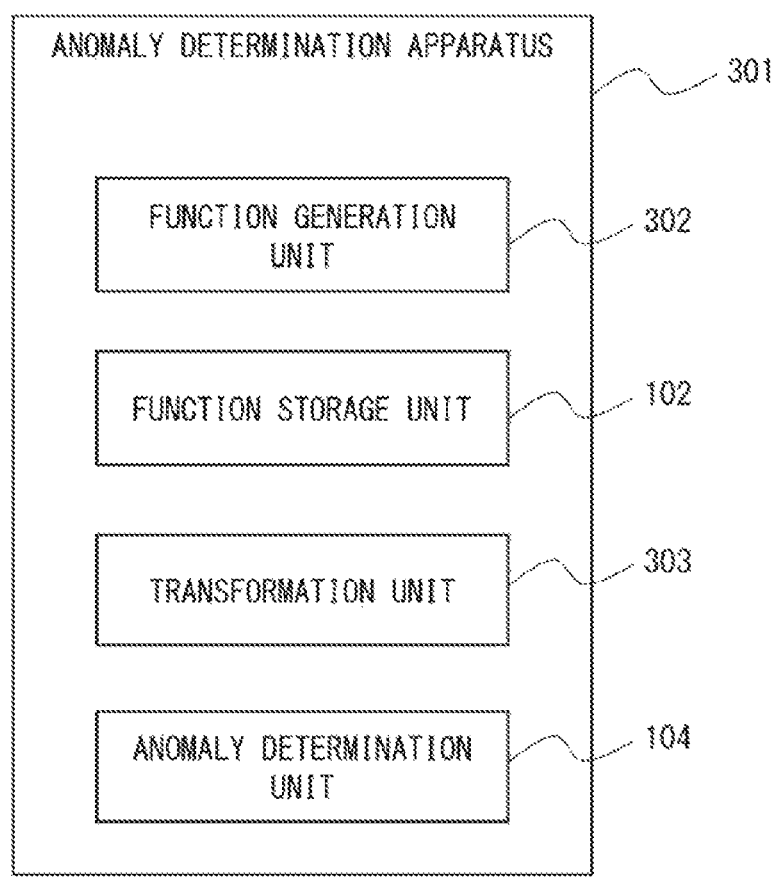
FIG. 10 is a block diagram showing an example of a configuration of an anomaly determination apparatus according to a third example embodiment.

A configuration of an anomaly determination apparatus 301 according to the third example embodiment will be described in detail with reference to FIG. 10. FIG. 10 is a block diagram showing an example of a configuration of an anomaly determination apparatus 301 according to the third example embodiment. As shown in FIG. 10, the anomaly determination apparatus 301 is similar to the anomaly determination apparatus 101 in that the anomaly determination apparatus 301 includes the function storage unit 102 and the anomaly determination unit 104, but is different from the anomaly determination apparatus 101 in that the anomaly determination apparatus 301 newly includes a function generation unit 302 and a transformation unit 303 in place of the transformation unit 103. Note that the transformation unit 303 corresponds to the transformation unit 2 shown in FIG. 1, and the anomaly determination unit 104 corresponds to the anomaly determination unit 3 shown in FIG. 1.

The function generation unit 302 generates parameters representing a monotonic transform function for transforming an anomaly level into a probability variable which is a variable in accordance with a specific probability distribution. Further, similarly to the transformation unit 103, the transformation unit 303 performs a transformation process by using a function defined by parameters stored in the function storage unit 102. Details of processes performed by the transformation unit 303 will be described later.

Figure 11:
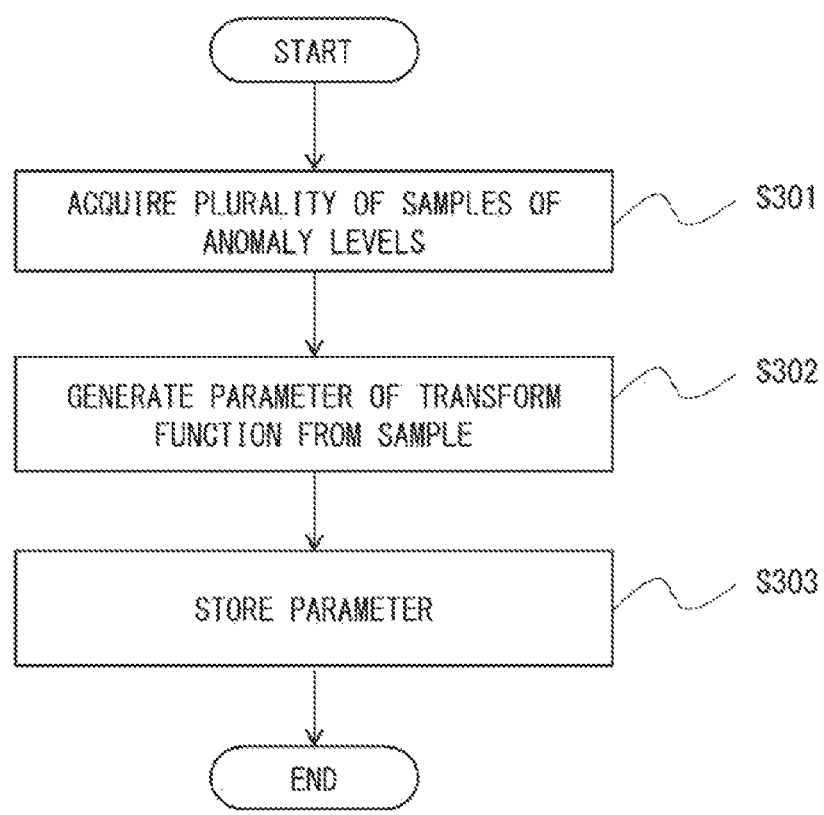
FIG. 11 is a flowchart showing a flow of processes for generating a function in the anomaly determination apparatus according to the third example embodiment.

FIG. 11 is a flowchart showing a flow of processes for generating a function performed in the anomaly determination apparatus 301 according to the third example embodiment.

Firstly, the function generation unit 302 of the anomaly determination apparatus 301 acquires a plurality of samples of anomaly levels (step 301 (S301)). Note that the function generation unit 302 acquires samples that are obtained during the operation of the determination-target apparatus by which processes performed become anomalous with a predetermined probability, instead of acquiring samples that are obtained when anomalies constantly occur in processes performed by the determination-target apparatus in a such a manner that the distribution of anomaly levels changes and they are determined in the second example embodiment. Note that similarly to the first example embodiment, for example, the function generation unit 302 may acquire a sample of an anomaly level that the anomaly determination apparatus 301 has received from other apparatuses or the like, or acquire a sample of an anomaly level stored in a storage device of the anomaly determination apparatus 301. Note that the anomaly level has already been calculated based on the signal value before being acquired by the function generation unit 302. The anomaly level may be calculated by the anomaly determination apparatus 301 or by other apparatuses. In the case where the anomaly level is calculated by the anomaly determination apparatus 301, the anomaly determination apparatus 301 may include, for example, an anomaly-level calculation unit that calculates a predetermined anomaly level from a signal output from the determination-target apparatus.

Next, the function generation unit 302 generates parameters representing a monotonic transform function for transforming a numerical value of an anomaly level into a probability variable, which is a variable in accordance with a specific probability distribution, based on the samples of the plurality of anomaly levels acquired in the step 301 (step 302 (S302)).

Then, the function generation unit 302 stores the generated parameters in the function storage unit 102 (step 303 (S303)).

As a result, the parameters necessary for a transformation performed by the transformation unit 303 are stored in the function storage unit 102. Similarly to the transformation unit 103 in the first example embodiment, the transformation unit 303 performs processes in accordance with the flowchart shown in the first example embodiment.

Note that the anomaly level acquired by the function generation unit 302 in the step S301 may be the same as or different from the anomaly level acquired by the transformation unit 103 in the step S101. Further, the specific probability distribution may be a uniform distribution or may be other arbitrary types of probability distributions.

When the anomaly level x conforms to a certain type of probability distribution (a cumulative distribution function $F_2$) different from the specific probability distribution (the cumulative distribution function $F_1$) of the probability variable y, the monotone increasing function for transforming the anomaly level x into the probability variable y is uniquely determined. Such a function is obtained by the below-shown Expression (6).

[Expression 6]

$$f_A(x) = F_1^{-1}(F_2(x)) \tag{6}$$

Further, similarly, the monotonic decreasing function for transforming the anomaly level x conforming to the cumulative distribution function $F_2$ into the probability variable y conforming to the cumulative distribution function $F_1$ is uniquely determined. Such a function is obtained by the below-shown Expression (7).

[Expression 7]

$$f_D(x) = F_1^{-1}(1 - F_2(x)) \tag{7}$$

The function generating unit 302 estimates parameters representing the function $f_A$ or $f_D$ by using samples of a plurality of anomaly levels, and stores the estimated parameters in the function storage unit 102. Further, the transformation unit 303 performs a transformation or an inverse transformation by the function $f_A$ or $f_D$ by using the parameters stored in the function storage unit 102.

An operation performed by the function generation unit 302 will be described by using an example in which the distribution of the anomaly level conforms to a normal distribution when the specific probability distribution is a uniform distribution in a continuous region [0, 1]. When the specific probability distribution is a uniform distribution in a continuous region [0, 1] and the anomaly level conforms to a normal distribution having a mean u and a standard deviation v, the function $f_0(x)$ described in the first example embodiment can be used as the transform function. In this case, the function generation unit 302 obtains a mean and a standard deviation of samples $x_1, \ldots, x_N$ of a plurality of anomaly levels, and stores the obtained mean and the standard deviation as parameters u and v, respectively, in the function storage unit 102. Further, the transformation unit 303 transforms the anomaly level or inversely transforms the threshold through an operation similar to that performed by the transformation unit 103 in the first example embodiment.

Next, operations performed by the function generation unit 302 and the transformation unit 303 will be described by using an example in which the specific probability distribution is a discrete uniform distribution of 0, . . . , N. In this case, a function $f_1(x)$ expressed by the below-shown Expression (8) may be used as the transform function for N values $x_n$ (n=1, . . . , N) of a plurality of anomaly levels.

[Expression 8]

$$f_1(x) = |\{n=1, \ldots, N | x_n \leq x\}| \quad (8)$$

It is considered that the value of this transform function $f_1(x)$ represents, when a value x is inserted in a sequence $x_{i(1)}, \ldots, x_{i(N)}$ that is obtained by rearranging $x_1, \ldots, x_N$ in an ascending order while maintaining the ordering, an ordinal position at the next of which the value x is inserted (e.g., the zeroth position when it is inserted at the top, the i(1)th position when it is inserted between $x_{i(1)}$ and $x_{i(2)}$, and the Nth position when it is inserted at the end). Therefore, assuming that the sample x is obtained from the same distribution as that of $x_1, \ldots, x_N$, it is equally possible that at which ordinal position in the sequence $x_{i(1)}, \ldots, x_{i(N)}$ the value of x is inserted. Therefore, it is expected that the distribution of the value of the function $f_1(x)$ is uniformly distributed over 0, . . . , N. Further, the transform function $f_1(x)$ is a monotone increasing function.

In order to realize this transform function $f_1(x)$, the function generation unit 302 rearranges the N values $x_n$ (n=1, . . . , N) of the anomaly levels, for example, in an ascending order, and stores the rearranged values $x_{i(1)}, \ldots, x_{i(N)}$ of the anomaly levels as parameters of the function in the function storage unit 102 while maintaining the ordering. Further, the transformation unit 303 may calculate the value of the function $f_1(x)$ by calculating the insertion position by, for example, a binary search.

In the binary search, when it is searched as to at which ordinal position in the sequence $x_{i(1)}, \ldots, x_{i(N)}$ the value x is inserted, for example, the [N/2]th value $x_{i([N/2])}$ is compared with the value x. Note that [N/2] is the largest integer that does not exceed N/2. In the case of $x_{i([N/2])} \geq x$, since the value x is inserted among the values $x_{i(1)}, \ldots, x_{i([N/2])}$, a similar process is recursively repeated for the sequence $x_{i(1)}, \ldots, x_{i([N/2])}$. Further, in the case of $x_{i([N/2])} < x$, since the value x is inserted among the values $x_{i([N/2])}, \ldots, x_{i(N)}$, a similar process is recursively repeated for the sequence $x_{i([N/2])}, \ldots, x_{i(N)}$. By repeating such recursive processes until the length of the sequence becomes zero, the transformation unit 303 obtains the position at which the value x is inserted and returns the obtained position as the value of the function $f_1(x)$. In the binary search, the length of the sequence is roughly reduced by half every time the recursion is performed. Therefore, the value of the function $f_1(x)$ can be calculated by performing the recursion $\log_2 N$ times on average.

Note that in the above-described example, the function generation unit 302 stores the values $x_{i(1)}, \ldots, x_{i(N)}$ of the anomaly level as parameters of the function in the function storage unit 102 while maintaining the ordering. In this process, the function generation unit 302 may store the values $x_{i(1)}, \ldots, x_{i(N)}$ of the anomaly level in the function storage unit 102 while maintaining the ordering by constructing an arbitrary data structure for maintaining the ordering (e.g., a sorted array, a search tree, a skip list, etc.) in the function storage unit 102. Further, when the function generation unit 302 constructs a search tree or a skip list in the function storage unit 102 as the above-described data structure, the transformation unit 303 may calculate the value of the function $f_1(x)$ by using a search algorithm corresponding to the respective data structure described above (i.e., a search algorithm of the search tree, a search algorithm of the skip list, etc.), instead of performing the binary search.

Note that in the above description, the function generation unit 302 generates, as parameters, an ordering relation when a plurality of samples of anomaly levels are arranged in an ascending order. However, needless to say, the function generation unit 302 may generate, as parameters, an ordering relation when a plurality of samples are arranged in a descending order. As described above, the transformation unit 303 calculates a probability variable value by calculating the order of the anomaly level to be transformed based on the ordering relation in an ascending order or a descending order.

Further, the specific probability distribution may be a uniform distribution in a continuous region [0, N]. In this case, a function $f_2(x)$ obtained by interpolating points in the function $f_1(x)$ may be used as the transform function. In this case, the function generation unit 302 stores, as parameters, a sequence $x_{i(1)}, \ldots, x_{i(N)}$ obtained by sorting N values $x_n$ (n=1, , N) of the anomaly levels or N values $x_n$ (n=1, . . . , N) selected at random from among the values of the anomaly levels in an ascending order in the function storage unit 102. Further, firstly, the transformation unit 303 acquires the value of the above-described function $f_1(x)$ (i.e., at which ordinal position in the sequence $x_{i(1)}, \ldots, x_{i(N)}$ the value x is inserted) by, for example, a binary search (this value is represented by j). Next, the value of the function $f_2(x)$ is calculated by, for example, linearly interpolating a point between $x_{i(j)}$ and $x_{i(j+1)}$. That is, the value of the function $f_2(x)$ is calculated by the below-shown Expression (9).

[Expression 9]

$$f_2(x) = j + \frac{x - x_{i(j)}}{x_{i(j+1)} - x_{i(j)}} \quad (9)$$

The transform function $f_2(x)$ obtained as described above is a monotone increasing function. Further, it is expected that the values of the probability variables transformed from the anomaly levels by the function $f_2(x)$ are uniformly distributed in the continuous region [0, N]. As described above, the transformation unit 303 may calculate a probability variable value by correcting a discrete order into a continuous order.

Further, the specific probability distribution may be an arbitrary probability distribution represented by using the above-described cumulative probability distribution $F_1$. The values of the function $f_2(x)/N$ obtained by dividing the above-described function $f_2(x)$ by N are uniformly distributed in the continuous region [0, 1] and the function $f_2(x)/N$ is a monotone increasing function. Therefore, the function $f_2(x)/N$ is considered to be estimates of the above-described cumulative distribution function $F_2(x)$ of the anomaly level. In this case, the transformation unit 303 may calculate the estimate $f_3(x)$ of the above-described transform function $f_4(x)$ by further transforming the value obtained by the above-described function $f_2(x)$. Specifically, the transformation unit 303 may calculate the transform function $f_3(x)$ by the below-shown Expression (10). Note that the Expression (10) corresponds to the above-shown Expression (6), and the function $f_2(x)/N$ is an estimate of the function $F_2(x)$ in the Expression (6).

[Expression 10]

$$f_3(x)=F_1^{-1}(f_2(x)/N) \quad (10)$$

It is expected that the value of the probability variable transformed by the transform function $f_3(x)$ conforms to a predetermined probability distribution represented by the cumulative distribution function $F_1$. Therefore, the transformation unit 303 may calculate the probability variable value by applying the inverse function $F_1^{-1}$ of the predetermined cumulative distribution function $F_1$ to the order of the anomaly levels to be transformed.

As described above, the transformation performed by the transformation unit 303 is not limited to the transformation by the transform function $f_2(x)$.

That is, the transformation unit 303 may perform a transformation by the transform function $f_3(x)$ derived from the transform function $f_2(x)$. The transform function $f_2(x)$ can be used when the specific probability distribution is a uniform distribution in the continuous region [0, N]. In contrast, the transform function $f_3(x)$ derived from the transform function $f_2(x)$ can be used when the specific probability distribution is an arbitrary probability distribution represented by the cumulative distribution function $F_1$.

As described above, by the function generation unit 302 and the transformation unit 303, it is possible to determine an anomaly by using a monotonic transform function for transforming the value of an anomaly level into the value of a probability variable which is a variable in accordance with an arbitrary specific probability distribution $F_1$.

Next, the effect of the anomaly determination apparatus 301 according to the third example embodiment will be described. According to the anomaly determination apparatus 301 in accordance with the third example embodiment, it is possible to easily infer whether or not an anomaly has occurred in a sample. The reason for this easy inference is similar to that explained in the first example embodiment. Further, according to the anomaly determination apparatus 301 in accordance with the third example embodiment, it is possible to easily generate a transform function used for determining an anomaly of a sample. This is because even when the distribution of the anomaly levels is unknown, a transform function for transforming an anomaly level into a probability variable which is a variable in accordance with an arbitrary probability distribution can be generated by using a sample of the anomaly level.

Fourth Example Embodiment

Next, a fourth example embodiment will be described. In the following description, the characteristic features according to this example embodiment will be mainly described. Further, the same symbols are assigned to structures similar to those in the above-described first example embodiment and redundant descriptions thereof are omitted.

Figure 12:
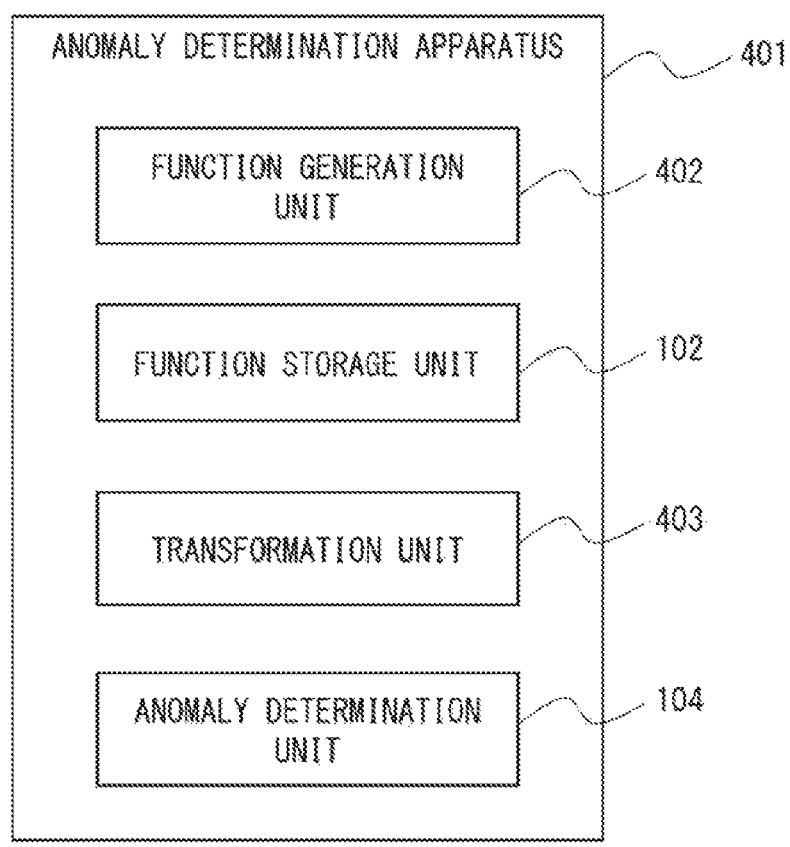
FIG. 12 is a block diagram showing an example of a configuration of an anomaly determination apparatus according to a fourth example embodiment.

A configuration of an anomaly determination apparatus 401 according to the fourth example embodiment will be described in detail with reference to FIG. 12. FIG. 12 is a block diagram showing an example of the configuration of the anomaly determination apparatus 401 according to the fourth example embodiment. As shown in FIG. 12, the anomaly determination apparatus 401 is different from the anomaly determination apparatus 301 shown in FIG. 10 in that the anomaly determination apparatus 401 includes a function generation unit 402 in place of the function generation unit 302, and a transformation unit 403 in place of the transformation unit 303. Note that the transformation unit 403 corresponds to the transformation unit 2 shown in FIG. 1, and the anomaly determination unit 104 corresponds to the anomaly determination unit 3 shown in FIG. 1.

Similarly to the function generation unit 302, the function generation unit 402 generates parameters representing a monotonic transform function for transforming an anomaly level into a probability variable which is a variable in accordance with a specific probability distribution. However, the function generation unit 402 generates a transform function by estimating a distribution of the signal and specifying a transform function by using parameters of the estimated distribution of the signal. Note that details of the process performed by the function generation unit 402 will be described later. Further, similarly to the transformation unit 103, the transformation unit 403 performs a transformation process by using a function defined by parameters stored in the function storage unit 102. Details of processes performed by the transformation unit 403 will be described later.

Figure 13:
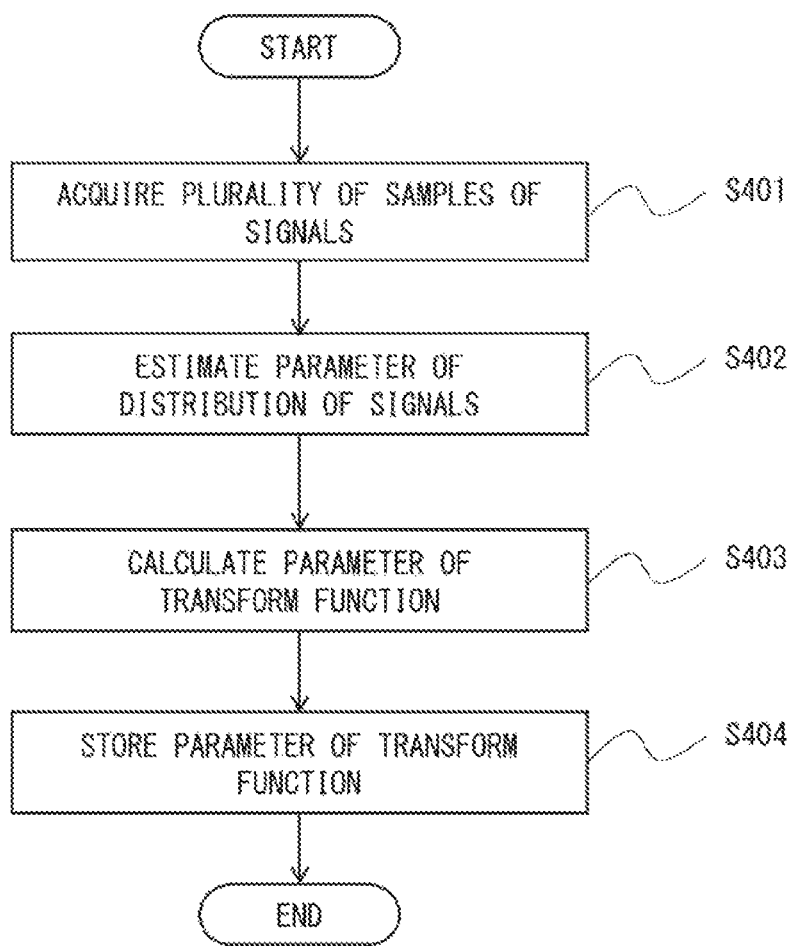
FIG. 13 is a flowchart showing a flow of processes performed in the anomaly determination apparatus according to the fourth example embodiment.

FIG. 13 is a flowchart showing a flow of processes performed in the anomaly determination apparatus 401 according to the fourth example embodiment.

Firstly, the function generation unit 402 acquires a plurality of samples of signals (step 401 (S401)). Note that the function generation unit 402 acquires samples that are obtained during the operation of the determination-target apparatus by which processes performed become anomalous with a predetermined probability, instead of acquiring samples that are obtained when anomalies constantly occur in processes performed by the determination-target apparatus in a such a manner that the distribution of anomaly levels changes and they are determined in the second example embodiment. Note that the function generation unit 402 may, for example, acquire a sample of a signal that the anomaly determination apparatus 401 has received from other apparatuses or the like, or acquire a sample of a signal stored in a storage device of the anomaly determination apparatus 401.

Next, the function generation unit 402 estimates a distribution of the signal (parameters of a distribution of the signal) based on the samples of the plurality of signals acquired in the step 401 (step 402 (S402)).

Next, the function generation unit 402 calculates parameters representing a transform function corresponding to the distribution of the signal estimated in the step 402 (step 403 (S403)).

Next, the function generation unit 402 stores the parameters representing the transform function acquired in the step 403 in the function storage unit 102 (step 404 (S404)).

As a result, the parameters necessary for a transformation performed by the transformation unit 403 are stored in the function storage unit 102. Similarly to the transformation unit 103 in the first example embodiment, the transformation unit 403 performs processes in accordance with the flowchart shown in the first example embodiment.

Note that in this example embodiment, the anomaly level may also be calculated by the anomaly determination apparatus 401 or by other apparatuses. In the case where the anomaly level is calculated by the anomaly determination apparatus 401, the anomaly determination apparatus 401 may include, for example, an anomaly-level calculation unit that calculates a predetermined anomaly level from a signal output from the determination-target apparatus.

Note that the anomaly level may be a value of a likelihood function (a probability density function) of a distribution of signals. In this case, when the anomaly determination apparatus 401 includes an anomaly-level calculation unit, the anomaly-level calculation unit may calculate an anomaly level (i.e., a value of the likelihood function) from the estimated distribution of the signal. Specifically, the anomaly-level calculation unit may calculate an anomaly level by using an Expression (13), (17) or (21) shown later. Further, the specific probability distribution may be a uniform distribution or an arbitrary type of a distribution. When the anomaly level is a value of the likelihood function and the specific probability distribution is a uniform distribution, a function $f_4(x)$ defined by the below-shown Expression (11) can be used as the transform function.

[Expression 11]

$$f_4(x) = \Pr_z[p_0(z) \leq x] \quad (11)$$

In the expression, the function $p_0(z)$ is a likelihood function (a probability density function) of a distribution of signals. That is, the function $p_0(z)$ represents a distribution of signals. Further, the probability symbol $\Pr_z[\cdot]$ is a probability that the condition in parentheses [·] is satisfied when a signal z is sampled from the distribution $p_0(z)$ of the signal. Specifically, the transform function $f_4(x)$ defined by the above-show Expression (11) can be obtained as shown below.

The right side of the Expression (11) is equal to an expected value of the probability variable $I[p_0(z) \leq x]$. It should be noted that the indicator function $I[\cdot]$ is a function that returns a value 1 when the condition in parentheses [·] holds and returns a value 0 when the condition does not holds. Therefore, the value of the transform function $f_4(x)$ in the Expression (11) can be obtained by the below-shown Expression (12).

[Expression 12]

$$f_4(x) = \int I[p(z) \leq x] p_0(z) dz = \int_{p_0(z) \leq x} p_0(z) dz \quad (12)$$

The function generation unit 402 estimates a distribution $p_0(z)$ of signals by using a plurality of samples of signals. Next, the function generating unit 402 calculates parameters of the transform function $f_4(x)$, which corresponds to the distribution $p_0(z)$ of the signal through the Expression (12), and stores the calculated parameter in the function storage unit 102. Note that in this example embodiment, the function generation unit 402 does not generate the transform function $f_4(x)$ by directly calculating the integral expression at the rightmost side of the Expression (12). In this example embodiment, a transform function used by the transformation unit 403 is generated by specifying parameters for a predetermined function, which is a mathematical expression (e.g., the below-shown Expression (16)) obtained by modifying the integral expression at the rightmost side of the Expression (12). That is, the function generation unit 402 generates, by specifying the values of the parameters of the predetermined function, a transform function defined by that function and the parameters. Then, the transformation unit 403 performs a transformation process by using the generated transform function.

Figure 14:
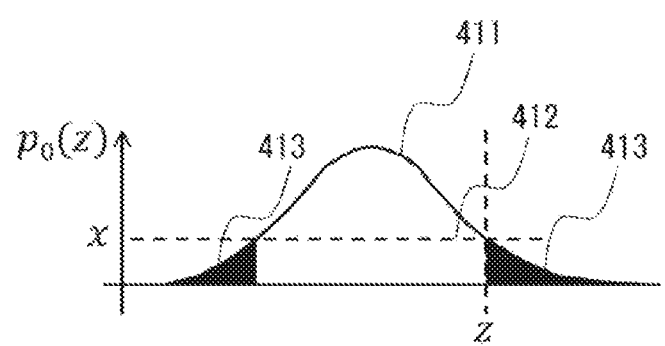
FIG. 14 is a graph for explaining a characteristic of a transform function $f_4(x)$ represented by Expression (12)

The characteristic of the transform function $f_4(x)$ represented by the Expression (12) will be described in a more detailed manner with reference to FIG. 14. The value of the integral at the rightmost side of the Expression (12) is equal to the area of a region 413 in FIG. 14 (the filled area in FIG. 14). This region 413 is a region sandwiched between the graph 411 and the horizontal axis $p_0(z)=0$ and is a region in a range of the signal z in which the graph 411 is below the line $p_0(z)=x$ (a broken line 412). Note that the graph 411 is a graph of the likelihood function $p_0(z)$ of the signal z. Therefore, the value of the transform function $f_4(x)$ is a monotone increasing function that takes a minimum value $f_4(x)=0$ when x<0 and takes a maximum value $f_4(x)=1$ when x is equal to or greater than the maximum value of the likelihood function $p_0(z)$.

Alternatively, the integral at the rightmost side of the Expression (12) can be regarded as a cumulative distribution function of the value x when the anomaly level $x=p_0(z)$ is regarded as a variable. In this case, because of the characteristic of the cumulative distribution function, when the signal z conforms to the probability distribution of the signal, the function $f_4(x)$ conforms to the uniform distribution in the continuous region [0, 1].

As described above, since the function $f_4(x)$ is a monotone increasing function for transforming the distribution of the anomaly level into a uniform distribution in the continuous region [0, 1], the function $f_4(x)$ is certainly the above-described cumulative distribution function $F_2(x)$ of the distribution of the anomaly level. Therefore, it is possible to obtain the transform function $f_A(x)$ or $f_D(x)$ for an arbitrary specific probability distribution having the cumulative distribution function $F_1(x)$ by substituting the function $f_4(x)$ into the function $F_2(x)$ of the Expression (6) or (7). In this case, the function generation unit 402 estimates the distribution $p_0(z)$ of the signal based on the plurality of samples of the signals. Next, the function generation unit 402 calculates parameters representing the transform function $f_A(x)$, which corresponds to the distribution $p_0(z)$ through the Expressions (12) and (6), and stores the calculated values of the parameters in the function storage unit 102. Alternatively, the function generation unit 402 calculates parameters representing the transform function $f_D(x)$, which corresponds to the distribution $p_0(z)$ through the Expressions (12) and (7), and stores the calculated values of the parameters in the function storage unit 102. In this way, it is possible to use not only the uniform distribution but also an arbitrary type of a distribution as the specific probability distribution.

Incidentally, for the estimation of the distribution $p_0(z)$ of the signal in the step 402, a parametric method (maximum likelihood estimation, MAP (Maximum A Posteriori) estimation, an EM (Expectation Maximization) algorithm, etc.) may be used, or a non-parametric method (kernel density estimation, a histogram method, etc.) may be used. However, an arbitrary method other than these methods may be used for the estimation of the distribution.

The distribution of the signal may be, for example, a normal distribution. In this case, when the function generation unit 402 estimates the distribution of the signal, for example, maximum likelihood estimation can be used as an example of the parametric method. An operation that is performed by the function generation unit 402 when the signal distribution is a normal distribution will be described hereinafter in detail.

When the distribution of the signal is a normal distribution, the likelihood function (the probability density function) is expressed by the below-shown Expression (13).

[Expression 13]

$$p_{normal}(z) = \frac{1}{\sqrt{2\pi\sigma^2}} \exp\left\{-\frac{1}{2\sigma^2}(z-\mu)^2\right\} \quad (13)$$

In this case, the parameters of the distribution of the signal are a mean $\mu$ and a variance $\sigma^2$. The function generation unit 402 estimates the distribution of the signal by determining the mean $\mu$ and the variance $\sigma^2$ so as to maximize the product of the likelihood function $p_{normal}(z)$ for the plurality of samples of the signals. Such a mean $\mu$ and a variance $\sigma^2$ can be obtained as a solution of the below-shown Expression (14).

[Expression 14]

$$\underset{\mu,\sigma^2}{\mathrm{argmax}}\left\{\prod_{n=1}^{N} p_{normal}(z_n)\right\} \quad (14)$$

The solution of the Expression (14) can be obtained by the below-shown two Expressions (15). That is, the function generation unit 402 estimates the distribution of the signal by calculating the mean $\mu$ and the variance $\sigma^2$ by the Expression (15).

[Expression 15]

$$\mu = \frac{1}{N}\sum_{n=1}^{N} z_n \quad (15)$$

$$\sigma^2 = \frac{1}{N}\sum_{n=1}^{N} (z_n - \mu)^2$$

The transform function $f_{normal}(x)$ which is determined by the Expression (12) according to the distribution $p_{normal}(z)$ of the signal is expressed by the below-shown Expression (16). Note that in Expression (16), $\mathrm{erfc}(\cdot)$ is a complementary error function.

[Expression 16]

$$f_{normal}(x) = \int_{p_{normal}(z) \leq x} p_{normal}(z)dz = \mathrm{erfc}\left(\sqrt{-\frac{1}{2}\log(2\pi\sigma^2 x^2)}\right) \quad (16)$$

Therefore, the parameter that specifies the transform function $f_{normal}(x)$ is $\sigma^2$. Consequently, the function generation unit 402 stores the parameter $\sigma^2$ in the function storage unit 102.

Further, the transformation unit 403 transforms the anomaly level (or inversely transforms the threshold) by using the stored parameter $\sigma^2$ and the Expression (16). That is, the transformation unit 403 transforms the anomaly level (or inversely transforms the threshold) by using the predetermined mathematical expression, i.e., the Expression (16) and the transform function defined by the parameter $\sigma^2$ whose value has been specified by the function generation unit 402. Note that the Expression (16) is also stored in advance in, for example, the function storage unit 102 in order to enable the transformation unit 403 to perform the transformation. As described above, in this example embodiment, the transformation unit 403 performs a transformation by using the predetermined mathematical expression and the transform function defined by parameters whose values are specified by the function generation unit 402.

Incidentally, the signal may be a vector quantity composed of a plurality of numerical values, and the distribution of the signal may be, for example, a multivariate normal distribution. In this case, when the function generation unit 402 estimates the distribution of the signal, it may use maximum likelihood estimation as in the case of the above-described normal distribution. An operation that is performed by the function generation unit 402 when the signal is a vector quantity composed of a plurality of numerical values and the distribution of the signal is a multivariate normal distribution is described hereinafter in detail.

When the distribution of the signal is a normal distribution, the likelihood function (the probability density function) is expressed by the below-shown Expression (17).

[Expression 17]

$$p_{multi}(z) = \frac{1}{\sqrt{(2\pi)^D |\Sigma|}} \exp\left\{-\frac{1}{2}(z-\mu)^T \Sigma^{-1}(z-\mu)\right\} \quad (17)$$

In the expression, the signal z is a D-dimensional vector quantity and the parameters of the distribution of the signal are a mean $\mu$ and a covariance matrix $\Sigma$. The function generation unit 402 estimates the distribution of signals by determining the mean $\mu$ and the covariance matrix $\Sigma$ so as to maximize the product of the likelihood function $p_{multi}(z)$ for a plurality of samples of the signals. Such a mean $\mu$ and a covariance matrix $\Sigma$ can be obtained as a solution of the below-shown Expression (18).

[Expression 18]

$$\underset{\mu,\Sigma}{\mathrm{argmax}}\left\{\prod_{n=1}^{N} p_{multi}(z_n)\right\} \quad (18)$$

The solution of the Expression (18) can be obtained by the below-shown two Expressions (19). That is, the function generation unit 402 estimates the distribution of signals by calculating the mean $\mu$ and the covariance matrix $\Sigma$ by the Expressions (19).

[Expression 19]

$$\mu = \frac{1}{N}\sum_{n=1}^{N} z_n \quad (19)$$

$$\Sigma = \frac{1}{N}\sum_{n=1}^{N} (z_n - \mu)(z_n - \mu)^T$$

The transform function $f_{multi}(x)$ determined by the Expression (12) according to the distribution $p_{multi}(z)$ of the signal is expressed by the below-shown Expression (20).

[Expression 20]

$$f_{multi}(x) = \int_{p_{multi}(z) \leq x} p_{multi}(z)dz = G\left(\frac{D}{2}, -\log\left(\sqrt{(2\pi)^D |\Sigma|} x\right)\right) \quad (20)$$

In the expression, D is the dimension of the signal vector z. Further, a function $G(s, t) = \Gamma(s, t)/\Gamma(s)$ defined on the conditions $s \geq 0$ and $t \geq 0$ is a ratio between an incomplete gamma function $\Gamma(s, t)$ of the second kind and a gamma function $\Gamma(s)$. This Expression (20) becomes identical to the Expression (16) when D=1. This is also obvious from the fact that an ordinary normal distribution coincides with a one-dimensional multivariate normal distribution.

As obvious from the Expression (20), the parameter that defines the transform function $f_{multi}(x)$ is the covariance matrix $\Sigma$. Therefore, the function generation unit 402 stores the parameter $\Sigma$ in the function storage unit 102.

Further, the transformation unit 403 transforms the anomaly level (or inversely transforms the threshold) by using the stored parameter $\Sigma$ and the Expression (20).

Further, the distribution of the signal may be, for example, a mixture distribution. In this case, when the function generation unit 402 estimates the distribution of the signal, for example, it can use an EM algorithm as an example of the parametric method. When the distribution of the signal is a mixture distribution, the likelihood function (the probability density function) is expressed by the below-shown Expression (21).

[Expression 21]

$$p_{mix}(z) = \sum_{k=1}^{K} \pi_k p_k(z | \theta_k) \quad (21)$$

In the expression, $k=1, \ldots, K$ represents each mode of the mixture distribution and $\pi_k$ is a mixture ratio (a mixture probability) of a mode k. Further, $p_k$ is a likelihood function of the probability distribution of the mode k and $\theta_k$ is a set of parameters of the probability distribution of the mode k. For example, when the probability distribution of mode k is, though not limited thereto, a multivariate normal distribution in which the likelihood function is defined by, for example, the Expression (17), the set of parameters $\theta_k$ is a set of a mean and a covariance matrix, i.e., $\theta_k = (\mu_k, \Sigma_k)$ and the likelihood function $p_k$ is expressed by the below-shown Expression (22).

[Expression 22]

$$p_k(z | \theta_k) = \frac{1}{\sqrt{(2\pi)^D |\Sigma_k|}} \exp\left\{-\frac{1}{2}(z - \mu_k)^T \sum_k^{-1} (z - \mu_k)\right\} \quad (22)$$

Further, the probability distributions of the modes may be different from each other or the same as each other. Further, the probability distribution of the mode may be a distribution over multiple variables, such as the above-described multivariate normal distribution. Further, the probability distribution of the mode may be other types of mixture distributions. In this case, the set $\theta_k$ of parameters of the probability distribution (the mixture distribution) of the mode k is the mixture ratio $\pi_{kj}$ of each mode $j=1, \ldots, J$ of the probability distribution (the mixture distribution) of the mode k and a set $(\pi_{k1}, \ldots, \pi_{kJ}, \theta_{k1}, \ldots, \theta_{kJ})$ of the parameters $\theta_{kj}$ of the probability distribution of j. As described above, an arbitrary probability distribution may be used as the probability distribution of the mode of the mixture distribution. Hereinafter, the parameters $(\pi_1, \ldots, \pi_K, \theta_1, \ldots, \theta_K)$ of the mixture distribution are collectively expressed as the parameter $\theta$.

An operation through which the function generation unit 402 estimates a distribution of signals based on the EM algorithm when the distribution of signals is a mixture distribution will be described hereinafter in detail. The EM algorithm is a kind of an iterative method that maximizes the value of the likelihood by repeatedly improving the parameter $\theta$ of the mixture distribution. In this sense, the EM algorithm is a kind of approximate maximum likelihood estimation.

In the EM algorithm, a new parameter $\theta^{new}$ is obtained from a parameter $\theta^{old}$ used in the previous iteration by the below-shown three Expressions (23).

[Expression 23]

$$\theta^{new} = \operatorname*{argmax}_{\theta} Q(\theta, \theta^{old}), \quad (23)$$

$$Q(\theta, \theta^{old}) = \sum_{S} \sum_{n=1}^{N} \gamma_{n,s_n} \log\{\pi_k^{old} p_k(z_n | \theta_k^{old})\},$$

$$\gamma_{nk} = \frac{\pi_k^{old} p_k(z_n | \theta_k^{old})}{\sum_{k=1}^{K} \pi_k^{old} p_k(z_n | \theta_k^{old})}$$

In the expression, $s_n$ is a latent variable that indicates, among the distributions constituting the mixture distribution, a mode of a distribution from which a respective sample $z_n$ of the signal is generated. Further, when the sample $z_n$ is generated from the mixture k, the variable $s_n$ is equal to k ($s_n = k$). Further, the sum of S in the above-shown expression is the sum of all possible combinations ($K^N$ combinations) of the variable $s_n$ for $n=1, \ldots, N$.

For example, when the likelihood function $p_k(z|\theta_k)$ of the probability distribution of the mode k, that is, the distribution $p_k(z|\theta_k)$ of the mode is a multivariate normal distribution (i.e., when the distribution of the signal is a normal mixture distribution), the solution of the Expression (23) can be expressed in a closed form and is calculated by the below-shown four Expressions (24). Note that the parameter $\theta$ of the mixture distribution is expressed as $\theta = (\pi_1, \ldots, \pi_K, \theta_1, \ldots, \theta_K)$ as defined above. Note that each $\theta_k$ is a parameter of the distribution of a respective mode, and in the case of the normal mixture distribution, the parameter $\theta_k$ is expressed as $\theta_k = (\mu_k, \Sigma_k)$ as defined above. Therefore, $\theta$ is expressed as $\theta = (\pi_1, \ldots, \pi_K, (\mu_1, \Sigma_1), \ldots (\mu_K, \Sigma_K))$. Therefore, $\theta^{new}$ is expressed as $\theta^{new} = (\pi^{new}_1, \ldots \pi^{new}_K, (\mu^{new}_1, \Sigma^{new}_1), \ldots, (\mu^{new}_K, \Sigma^{new}_K))$. That is, $\theta^{new}$ is calculated by calculating $\pi^{new}_k$, $\mu^{new}_k$, and $\Sigma^{new}_k$ by the Expression (24).

[Expression 24]

$$N_k = \sum_{n=1}^{N} \gamma_{nk}$$

$$\pi_k^{new} = \frac{N_k}{N}$$

$$\mu_k^{new} = \frac{1}{N_k} \sum_{n=1}^{N} \gamma_{nk} z_n,$$

$$\sum\nolimits_k^{new} = \frac{1}{N_k} \sum_{n=1}^{N} \gamma_{nk}(z_n - \mu_k^{new})(z_n - \mu_k^{new})^T$$

(24)

In the case where the distribution of the mode is an ordinary normal distribution, i.e., is not a multivariate distribution, the calculation can be performed in exactly the same way based on the one-dimensional vector.

The function generation unit 402 calculates a new parameter $\theta^{new}$ of the mixture distribution from the previous parameter set $\theta^{old}$ of the mixture distribution by the Expressions (23) and (24), and thereby updates the parameter. The function generation unit 402 successively repeats the updating until these parameters converge. The function generation unit 402 estimates the distribution of the signal by estimating the parameter $\theta$ of the mixture distribution by using the above-described EM algorithm.

When the distribution of the signal is a mixture distribution, the transform function $f_{mix}(x)$, which corresponds to the distribution of the signal through the Expression (12), can be calculated by the below-shown Expression (25).

[Expression 25]

$$f_{mix}(x) = \sum_{k'=1}^{K} \pi_{k'} \int_{\sum_{k=1}^{K} \pi_k p_k(z|\theta_k) \leq x} p_{k'}(z|\theta_{k'}) dz$$

(25)

Figure 15:
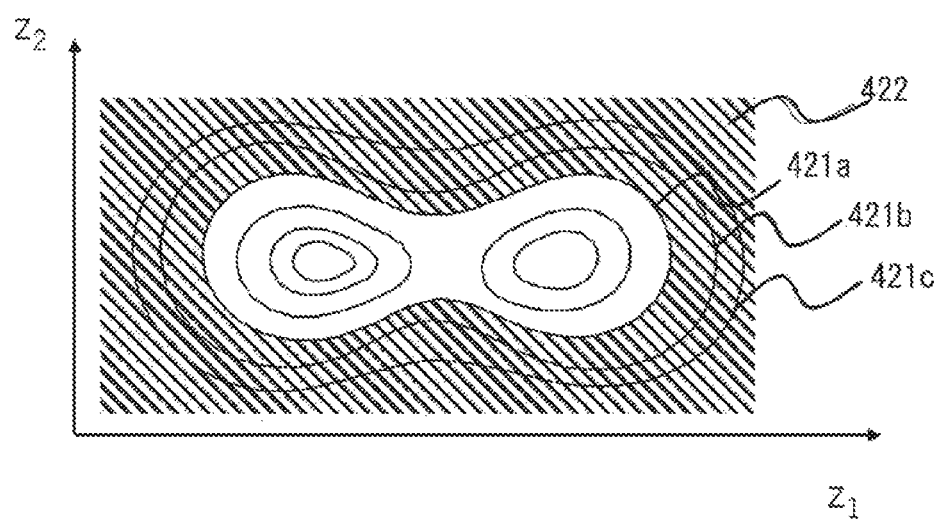
FIG. 15 is a diagram schematically showing an integral interval in Expression (25)

However, the integral interval that appears in the Expression (25) is complicated, making it difficult to exactly calculate $f_{mix}(x)$. This fact will be described in detail with reference to FIG. 15. FIG. 15 is a diagram schematically showing the integral interval in the Expression (25). In FIG. 15, for the sake of explanation, it is assumed, though not limited thereto, that the signal z is a two-dimensional vector quantity.

In FIG. 15, a signal $z=(z_1, z_2)$ corresponds to a point $(z_1, z_2)$. In FIG. 15, curves such as curves 421a, 421b and 421c are contour lines of the likelihood function $p_{mix}(z)$. In particular, the curve 421a is a contour line represented by an equation $p_{mix}(z)=x$. Therefore, the integral range on the right side of the Expression (12) is a region 422 (a hatched region) outside the curve 421a. As shown in FIG. 15, the likelihood function $p_{mix}(z)$ of the mixture distribution is a multimodal function. Therefore, the likelihood function $p_{mix}(z)$ of the mixture distribution can be considered to be more complicated compared to the fact that the likelihood function of the normal distribution represented by the Expression (13) or the likelihood function of the multivariate normal distribution represented by the Expression (17) is a unimodal function. Therefore, it is typically difficult to express the integral range of the Expression (25), which is represented by the region 422, in the closed form of the value z. Therefore, it is difficult to directly calculate the integral of the Expression (25).

In such a case, the function generation unit 402 may generate a transform function by the below-shown approximate integration method. Further, in such a case, the below-shown approximated transform function is used as the transform function. For the anomaly level $x_1$ corresponding to the signal $z_1$, a lower-limit approximate value $f^-_{mix}(x_1)$ and an upper-limit approximate value $f^+_{mix}(x_1)$ of the transform function $f_{mix}(x_1)$ are defined as shown by the below-shown Expression (26).

[Expression 26]

$$f^-_{mix}(x_1) = \sum_{k=1}^{K} \pi_k \int_{p_{mix}(z) \leq \max_m \{\pi_m p_m(z_1|\theta_m)\}} p_k(z|\theta_k) dz$$

$$f^+_{mix}(x_1) = \sum_{k=1}^{K} \pi_k \int_{\pi_k p_k(z|\theta_k) \leq x_1} p_k(z|\theta_k) dz$$

(26)

Note that since the anomaly level $x_1$ is the value $x_1=p_{mix}(z_1)$ of the likelihood function of the signal $z_1$, a relation $\pi_k p_k(z) \leq p_{mix}(z)$ holds for an arbitrary z for $k=1, \ldots, K$ according to the Expression (21). Therefore, from the inclusion relation of the integral interval, an inequality expressed by the below-shown Expression (27) holds.

[Expression 27]

$$f^-_{mix}(x_1) \leq f_{mix}(x_1) \leq f^+_{mix}(x_1)$$

(27)

Meanwhile, the intermediate approximate value $\tilde{f}_{mix}(x_1)$ for the value of the transform function $f_{mix}(x_1)$ is defined as shown by the below-shown Expression (28).

[Expression 28]

$$\tilde{f}_{mix}(x_1) = \sum_{k=1}^{K} \pi_k \int_{\pi_k p_k(z|\theta_k) \leq \max_m \{\pi_m p_m(z_1|\theta_m)\}} p_k(z|\theta_k) dz$$

(28)

Note that referring to the Expression (21) again, since the relation $\pi_k p_k(z) \leq p_{mix}(z)$ holds for an arbitrary z, an inequality of the below-shown Expression (29) holds.

[Expression 29]

$$f^-_{mix}(x_1) \leq \tilde{f}_{mix}(x_1) \leq f^+_{mix}(x_1)$$

(29)

Comparing the Expressions (27) and (29), it can be considered that similarly to the value $f_{mix}(x_1)$, in the sense that the approximate value $\tilde{f}_{mix}(x_1)$ is sandwiched between the lower-limit approximate value $f^-_{mix}$ and the upper-limit approximate value $f^+_{mix}$, the approximate value $\tilde{f}_{mix}(x_1)$ is an approximate value of the value $f_{mix}(x_1)$. Further, this approximation becomes accurate when each mode of the mixture distribution (i.e., each distribution constituting the mixture distribution) does not have a mutually overlapping part.

The integral of the Expression (28) can be calculated relatively easily. For example, when the probability distribution of the mode is, though not limited thereto, a multivariate normal distribution, the integral that appears in the Expression (28) has the same form as that in the Expression (20). Therefore, the integral can be easily calculated by the below-shown Expression (30).

[Expression 30]

$$\int_{\pi_k p_k(z|\theta_k) \leq \max_m\{\pi_m p_m(z_1|\theta_m)\}} p_k(z \mid \theta_k) dz = \quad (30)$$
$$G\left(\frac{D}{2}, -\log\left(\sqrt{(2\pi)^D|\Sigma_k|} \frac{1}{\pi_k}\max_m\{\pi_m p_m(z_1 \mid \theta_m)\}\right)\right)$$

Similarly, the integral that appears in the Expression (28) generally has the same form as that of the integral that appears when the probability distribution of each mode is a probability distribution of signals and the transform function is generated by the integration method. Therefore, when a normal distribution, a multivariate normal distribution, or any other probability distribution that facilitates the calculation of the integration of the Expression (12) is used as the probability distribution of each mode, the approximate value $\tilde{f}_{mix}(x_1)$ of the transform function can be easily calculated.

That is, for the likelihood function $p_k(x_1|\theta_k)$ of each mode k, when the integration expressed in the below-shown Expression (31) having the same form as that of the Expression (12) can be easily calculated, the approximate value $\tilde{f}_{mix}(x_1)$ of the transform function is calculated by the below-shown Expression (32).

[Expression 31]

$$f_k(x) = \int_{p_k(z|\theta_k) \leq x} p_k(z \mid \theta_k) dz \quad (31)$$

[Expression 32]

$$\tilde{f}_{mix}(x_1 \mid \theta_k) = \int_{p_k(z|\theta) \leq \frac{1}{\pi_k}\max_m\{\pi_m p_m(z_1|\theta_m)\}} p_k(z \mid \theta_k) dz = \quad (32)$$
$$\sum_k^K \pi_k f_k\left(\frac{1}{\pi_k}\max_m\{\pi_m p_m(z_1 \mid \theta_m)\}\right)$$

When a mixture distribution is used as the distribution of the signal, the function generation unit 402 stores parameters $\theta_m$ and $\pi_m$ representing the approximation $\tilde{f}_{mix}$ of the transform function corresponding to the distribution of the signal in the function storage unit 102. That is, the function generation unit 402 generates a transform function by specifying a transform function, which is an approximate function, by using parameters of an estimated distribution of signals.

By using the parameters $\theta_m$ and $\pi_m$ stored in the function storage unit 102, the transformation unit 403 transforms the anomaly level x (or inversely transforms the threshold) by the Expressions (28) and (30).

Incidentally, the function generation unit 402 may calculate parameters of the transform function $f_A(x)$, $f_{\bar{A}}(x)$ or $f_D(x)$ from the distribution of signals by using a sampling method. In this case, the function generation unit 402 generates M samples $z_1, \ldots, z_m$ of the signals z from the estimated distribution of the signals by using random numbers. Next, the function generation unit 402 calculates the anomaly levels $x_1, \ldots, x_M$ corresponding to the respective signals $z_1, \ldots, z_M$. Note that the anomaly level may be a value of the likelihood function $x_n = p_0(z_n)$, or may be other types of values (e.g., a Mahalanobis distance). Note that the calculation of the anomaly level is not limited to those performed by the function generation unit 402. That is, the anomaly level may be calculated by an anomaly level calculation unit (not shown) of the anomaly determining apparatus 401.

The anomaly levels $x_1, \ldots, x_M$ generated as described above are considered to conform to the distribution of anomaly levels. Therefore, the function generation unit 402 calculates parameters representing the transform function $f_A(x)$, $f_{\bar{A}}(x)$ or $f_D(x)$ by performing processes similar to those performed by the function generation unit 302 in the third example embodiment. That is, by regarding the generated anomaly levels $x_1, \ldots, x_M$ as samples of a plurality of anomaly levels acquired in the step 301 in the example embodiment 3, it is possible to calculate parameters that define the transform function as in the case of the third example embodiment. Then, the transformation unit 403 performs processes similar to those performed by the transformation unit 303 in the third example embodiment and thereby transforms the anomaly level (or inversely transforms the threshold) by using the transform function $f_A(x)$, $f_{\bar{A}}(x)$ or $f_D(x)$. Such a sampling method is particularly effective in the case where the calculation of the above-described Expression (12) is difficult because, for example, the probability density function $p_0(z)$ of the signal is complicated.

Next, the effect of the anomaly determination apparatus 401 according to the fourth example embodiment will be described. According to the anomaly determination apparatus 401 in accordance with the fourth example embodiment, it is possible to easily infer whether or not an anomaly has occurred in a sample. The reason for this easy inference is similar to that explained in the first example embodiment. Further, according to the anomaly determination apparatus 401 in accordance with the fourth example embodiment, it is possible to easily generate a transform function used for determining an anomaly of a sample. Further, in the anomaly determination apparatus 301 according to the third example embodiment, when the transform function is generated, the transform function is generated by using a plurality of samples of anomaly levels. Therefore, it is necessary to prepare a large number of samples of anomaly levels. In contrast, the anomaly determination apparatus 401 according to the fourth example embodiment estimates the distribution of signals. Therefore, it can easily generate an arbitrary number of samples (samples of signals or samples of anomaly levels) from the estimated distribution of signals without restraint. Therefore, regarding the number of samples to be actually acquired, it is possible to generate the transform function with a smaller number of samples.

Lastly, a configuration example of hardware resources in the case where one of the above-described anomaly determination apparatuses 101, 201, 301 and 401 according to the example embodiments is implemented by using a calculation processing apparatus (an information processing apparatus or a computer) is described. However, the anomaly determination apparatuses 101, 201, 301 and 401 may be physically or functionally implemented by using at least two calculation processing apparatuses. Further, the anomaly determination apparatuses 101, 201, 301 and 401 may be implemented as dedicated apparatuses.

Figure 16:
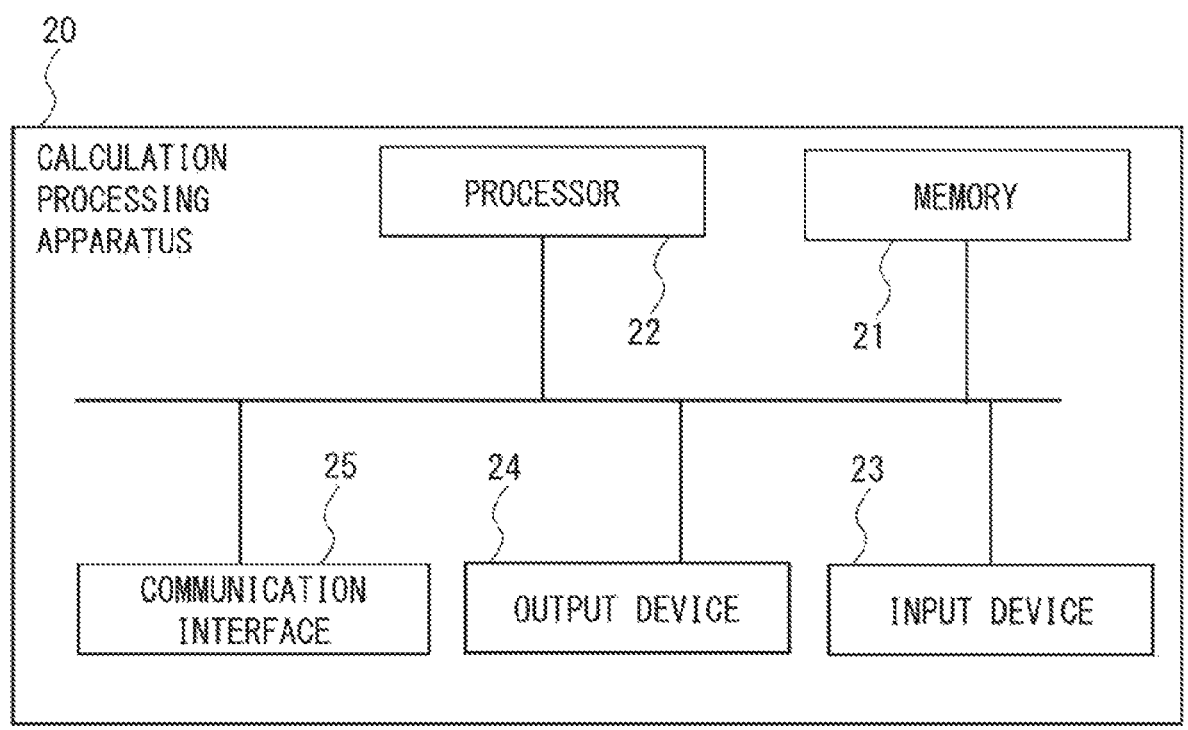
FIG. 16 is a block diagram schematically showing an example of a hardware configuration of a calculation processing apparatus capable of implementing an anomaly determination apparatus according to each example embodiment.

FIG. 16 is a block diagram schematically showing an example of a hardware configuration of a calculation processing apparatus 20 capable of implementing the anomaly determination apparatus 101, 201, 301 or 401. The calculation processing apparatus 20 includes a memory 21, a processor 22, an input device 23, an output device 24, and a communication interface 25. The calculation processing apparatus 20 does not have to include all of the input device 23, the output device 24, and the communication interface 25.

The memory 21 is formed by a combination of a volatile memory and a nonvolatile memory. The memory 21 may include a storage located remotely from the processor 22. In this case, the processor 22 may access the memory 21 through an input/output interface (not shown).

The memory 21 is used to store software (a computer program) or the like including instructions that are executed by the processor 22. Further, the function storage unit 102 is implemented by the memory 21.

The program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

The processor 22 loads a computer program (a group of instructions) from the memory 21 and executes the loaded program, and thereby performs processes of components other than the function storage unit 102 shown in FIG. 2, 6, 10 or 12. The processor 22 may be, for example, a CPU (Central Processing Unit) or an MPU (Micro Processing Unit). The processor 22 may include a plurality of processors.

The input device 23 is, for example, a keyboard and is a device that receives an input of information. The output device 24 is, for example, a display and is a device that outputs information. The communication interface 25 is, for example, a network interface card (NIC) and is an interface used to communicate with other apparatuses through a wired or wireless network. In each example embodiment, a signal or an anomaly level is input to the calculation processing apparatus 20 through the communication interface 25. Note that they may be input to the calculation processing apparatus 20 through the input device 23. Further, a result of a determination made by the anomaly determination unit 104 or 204 may be output to the output device 24. Further, the result of the determination may be transmitted to other apparatuses through the communication interface 25.

Note that the present invention is not limited to the above-described example embodiments and can be modified as appropriate without departing from the scope and spirit of the invention. The whole or part of the example embodiments disclosed above can be described as, but not limited to, the following supplementary notes.

(Supplementary Note 1)
An anomaly determination apparatus comprising:
a transformation unit configured to perform a transformation process using a transform function for transforming an anomaly level of a signal into a probability variable value, the probability variable value being a variable value in accordance with a predetermined probability distribution; and
an anomaly determination unit configured to determine presence/absence of an anomaly of a sample of the anomaly level by using a result of the transformation by the transformation unit, wherein
the transform function is a monotone function.

(Supplementary Note 2)
The anomaly determination apparatus described in Supplementary note 1, wherein the anomaly determination unit determines the presence/absence of an anomaly by a predetermined threshold.

(Supplementary Note 3)
The anomaly determination apparatus described in Supplementary note 2, wherein the anomaly determination unit determines the presence/absence of an anomaly by comparing a result of the transformation obtained by applying the transform function to the sample with the threshold.

(Supplementary Note 4)
The anomaly determination apparatus described in Supplementary note 2, wherein the anomaly determination unit determines the presence/absence of an anomaly by comparing a result of the transformation obtained by applying an inverse function of the transform function to the threshold with the sample.

(Supplementary Note 5)
The anomaly determination apparatus described in any one of Supplementary notes 2 to 4, wherein
the probability distribution is a uniform distribution, and
the threshold is a probability that the signal contains an anomaly or a probability that the signal does not contain an anomaly.

(Supplementary Note 6)
The anomaly determination apparatus described in Supplementary note 1, wherein the anomaly determination unit determines the presence/absence of an anomaly by determining, by a statistical test, whether a distribution obtained by applying the transform function to a plurality of samples of anomaly levels coincides with the probability distribution.

(Supplementary Note 7)
The anomaly determination apparatus described in Supplementary note 6, wherein the statistical test is a Kolmogorov-Smirnov test (Supplementary Note 8)
The anomaly determination apparatus described in any one of Supplementary notes 1 to 7, further comprising a function generation unit configured to generate a parameter representing the transform function.

(Supplementary Note 9)
The anomaly determination apparatus described in Supplementary note 8, wherein
the function generation unit generates, as the parameter, an ordering relation when the plurality of samples of anomaly levels are arranged in a descending order or an ascending order, and
the transformation unit calculates the probability variable value by calculating an order of anomaly levels to be transformed based on the ordering relation.

(Supplementary Note 10)
The anomaly determination apparatus described in Supplementary note 9, wherein the transformation unit calculates the probability variable value by correcting a discrete order into a continuous order.

(Supplementary Note 11)

The anomaly determination apparatus described in Supplementary note 9 or 10, wherein the transformation unit calculates the probability variable value by applying an inverse function of a predetermined cumulative distribution function to the order.

(Supplementary Note 12)

The anomaly determination apparatus described in any one of Supplementary notes 1 to 11, wherein the anomaly level is a likelihood function of the distribution of the signal.

(Supplementary Note 13)

The anomaly determination apparatus described in Supplementary note 8, wherein the anomaly level is a likelihood function of the distribution of the signal, and the function generation unit generates the transform function by estimating the distribution of the signal and specifying the transform function by using a parameter of the estimated distribution of the signal.

(Supplementary Note 14)

The anomaly determination apparatus described in Supplementary note 13, wherein the function generation unit estimates the distribution of the signal by maximum likelihood estimation or an EM algorithm.

(Supplementary Note 15)

The anomaly determination apparatus described in Supplementary note 13 or 14, wherein the function generation unit creates a plurality of samples of signals from the estimated distribution of the signal by using a random number, the function generation unit calculates the anomaly level of each of the plurality of samples of signals, the function generation unit generates, as the parameter, an ordering relation when the plurality of calculated anomaly levels are arranged in a descending order or an ascending order, and the transformation unit calculates the probability variable value by calculating an order of anomaly levels to be transformed based on the ordering relation.

(Supplementary Note 16)

The anomaly determination apparatus described in Supplementary note 13 or 14, wherein the distribution of the signal is a mixture distribution, and the function generation unit generates the transform function by specifying the transform function by using a parameter of the estimated distribution of the signal, the transform function being an approximate function (Supplementary Note 17)

A method for determining an anomaly, comprising:

performing a transformation process using a transform function for transforming an anomaly level of a signal into a probability variable value, the probability variable value being a variable value in accordance with a predetermined probability distribution; and determining presence/absence of an anomaly of a sample of the anomaly level by using a result of the transformation by the transformation process, wherein the transform function is a monotone function.

(Supplementary Note 18)

A program for causing a computer to perform:

a transformation step of performing a transformation process using a transform function for transforming an anomaly level of a signal into a probability variable value, the probability variable value being a variable value in accordance with a predetermined probability distribution; and an anomaly determination step of determining presence/absence of an anomaly of a sample of the anomaly level by using a result of the transformation by the transformation step, wherein the transform function is a monotone function.

Although the present invention is explained above with reference to example embodiments, the present invention is not limited to the above-described example embodiments. Various modifications that can be understood by those skilled in the art can be made to the configuration and details of the present invention within the scope of the invention.

This application is based upon and claims the benefit of priority from Japanese patent application No. 2017-233083, filed on Dec. 5, 2017, the disclosure of which is incorporated herein in its entirety by reference.

INDUSTRIAL APPLICABILITY

The present invention can be applied to, for example, an anomaly determination apparatus and an anomaly determination method for determining presence/absence of an anomaly in a sample of an anomaly level, and hence has industrial applicability.

REFERENCE SIGNS LIST

1 ANOMALY DETERMINATION APPARATUS
2 TRANSFORMATION UNIT
3 ANOMALY DETERMINATION UNIT
20 CALCULATION PROCESSING APPARATUS
21 MEMORY
22 PROCESSOR
23 INPUT DEVICE
24 OUTPUT DEVICE
25 COMMUNICATION INTERFACE
101 ANOMALY DETERMINATION APPARATUS
102 FUNCTION STORAGE UNIT
103 TRANSFORMATION UNIT
104 ANOMALY DETERMINATION UNIT
201 ANOMALY DETERMINATION APPARATUS
203 TRANSFORMATION UNIT
204 ANOMALY DETERMINATION UNIT
301 ANOMALY DETERMINATION APPARATUS
302 FUNCTION GENERATION UNIT
303 TRANSFORMATION UNIT
401 ANOMALY DETERMINATION APPARATUS
402 FUNCTION GENERATION UNIT
403 TRANSFORMATION UNIT

What is claimed is:

1. An anomaly determination apparatus comprising:

at least one memory storing program instructions; and at least one processor configured to execute the instructions stored in the memory to train a neural network for detecting an anomaly in a system by:

acquiring a sample of an abnormality level of a signal output from a determination target-apparatus while the determination-target apparatus is performing a predetermined process, the signal being at least one of a sound waveform, an oscillatory waveform, a current waveform, a voltage waveform, communication traffic, or log data, performing a transformation process using a transform function for transforming the anomaly level of the signal into a probability variable value, the probability variable value being a variable value in accordance with a predetermined probability distribution, determining presence/absence of an anomaly of the sample of the anomaly level by using a result of the transformation by the transformation process; and determining whether or not an abnormality has occurred in the predetermined process performed by the determination-target apparatus by using a result of the determination of presence/absence of the anomaly of the sample of the anomaly level, wherein the transform function is a monotone function, and the presence/absence of an anomaly is determined by comparing a result of the transformation obtained by applying an inverse function of the transform function to a predetermined threshold with the sample.

2. The anomaly determination apparatus according to claim 1, wherein the probability distribution is a uniform distribution, and the threshold is a probability that the signal contains an anomaly or a probability that the signal does not contain an anomaly.

3. The anomaly determination apparatus according to claim 1, the processor is further configured to execute the instructions to generate a parameter representing the transform function.

4. The anomaly determination apparatus according to claim 3, wherein the processor is further configured to execute the instructions to:

generate, as the parameter, an ordering relation when the plurality of samples of anomaly levels are arranged in a descending order or an ascending order, and calculate the probability variable value by calculating an order of anomaly levels to be transformed based on the ordering relation.

5. The anomaly determination apparatus according to claim 4, wherein the processor is further configured to execute the instructions to calculate the probability variable value by correcting a discrete order into a continuous order.

6. The anomaly determination apparatus according to claim 4, wherein the processor is further configured to execute the instructions to calculate the probability variable value by applying an inverse function of a predetermined cumulative distribution function to the order.

7. The anomaly determination apparatus according to claim 1, wherein the anomaly level is a likelihood function of the distribution of the signal.

8. The anomaly determination apparatus according to claim 3, wherein the anomaly level is a likelihood function of the distribution of the signal, and the processor is further configured to execute the instructions to generate the transform function by estimating the distribution of the signal and specifying the transform function by using a parameter of the estimated distribution of the signal.

9. The anomaly determination apparatus according to claim 8, wherein the processor is further configured to execute the instructions to estimate the distribution of the signal by maximum likelihood estimation or an EM algorithm.

10. The anomaly determination apparatus according to claim 8, wherein the processor is further configured to execute the instructions to:

create a plurality of samples of signals from the estimated distribution of the signal by using a random number, calculate the anomaly level of each of the plurality of samples of signals, generate, as the parameter, an ordering relation when the plurality of calculated anomaly levels are arranged in a descending order or an ascending order, and calculate the probability variable value by calculating an order of anomaly levels to be transformed based on the ordering relation.

11. The anomaly determination apparatus according to claim 8, wherein the distribution of the signal is a mixture distribution, and the processor is further configured to execute the instructions to generate the transform function by specifying the transform function by using a parameter of the estimated distribution of the signal, the transform function being an approximate function.

12. A method comprising:

training a neural network for detecting an anomaly in a system by:

acquiring a sample of an abnormality level of a signal output from a determination-target apparatus while the determination-target apparatus is performing a predetermined process, the signal being at least one of a sound waveform, an oscillatory waveform, a current waveform, a voltage waveform, communication traffic, or log data, performing a transformation process using a transform function for transforming the anomaly level of the signal into a probability variable value, the probability variable value being a variable value in accordance with a predetermined probability distribution, determining presence/absence of an anomaly of the sample of the anomaly level by using a result of the transformation by the transformation process; and determining whether or not an abnormality has occurred in the predetermined process performed by the determination-target apparatus by using a result of the determination of presence/absence of the anomaly of the sample of the anomaly level, wherein the transform function is a monotone function, and the presence/absence of an anomaly is determined by comparing a result of the transformation obtained by applying an inverse function of the transform function to a predetermined threshold with the sample.

13. A non-transitory computer readable medium storing a program for causing a computer to perform:

a training operation for training a neural network for detecting an anomaly in a system of acquiring a sample of an abnormality level of a signal output from a determination-target apparatus while the determination-target apparatus is performing a predetermined process, the signal being at least one of a sound waveform, an oscillatory waveform, a current waveform, a voltage waveform, communication traffic, or log data, performing a transformation process using a transform function for transforming the anomaly level of the signal into a probability variable value, the probability variable value being a variable value in accordance with a predetermined probability distribution, determining presence/absence of an anomaly of the sample of the anomaly level by using a result of the transformation by the transformation step; and determining whether or not an abnormality has occurred in the predetermined process performed by the determination-target apparatus by using a result of the determination of presence/absence of the anomaly of the sample of the anomaly level, wherein the transform function is a monotone function, and the presence/absence of an anomaly is determined by comparing a result of the transformation obtained by applying an inverse function of the transform function to a predetermined threshold with the sample.

\* \* \* \* \*